United States Patent
Ito

(10) Patent No.: US 9,587,042 B2
(45) Date of Patent: *Mar. 7, 2017

(54) PROCESS FOR PRODUCING MODIFIED CONJUGATED DIENE-BASED POLYMER, MODIFIED CONJUGATED DIENE-BASED POLYMER, AND POLYMER COMPOSITION

(75) Inventor: Mana Ito, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 13/431,931

(22) Filed: Mar. 27, 2012

(65) Prior Publication Data

US 2012/0252966 A1    Oct. 4, 2012

(30) Foreign Application Priority Data

Mar. 31, 2011    (JP) .................................. 2011-078767

(51) Int. Cl.
| | |
|---|---|
| C08C 19/25 | (2006.01) |
| C08F 8/42 | (2006.01) |
| C08C 19/44 | (2006.01) |
| C08L 9/06 | (2006.01) |
| C08C 19/22 | (2006.01) |

(52) U.S. Cl.
CPC ............... C08F 8/42 (2013.01); C08C 19/25 (2013.01); C08C 19/44 (2013.01); C08C 19/22 (2013.01); C08L 9/06 (2013.01)

(58) Field of Classification Search
CPC ......... C09C 19/25; C08C 19/26; C08C 19/22; C08C 19/25; C08C 19/44; C08F 8/30; C08F 8/42; C08J 2309/00; C08J 2309/06; C08J 2325/10; C08L 9/06
USPC ....................... 525/332.9, 342, 366, 374, 379
See application file for complete search history.

(56) References Cited

U.S. PATENT DOCUMENTS

| | | | |
|---|---|---|---|
| 5,652,310 A * | 7/1997 | Hsu | ........................ C08C 19/42 525/331.9 |
| 8,835,564 B2 * | 9/2014 | Fujii | ............................. 525/105 |
| 2004/0254301 A1 * | 12/2004 | Tsukimawashi | .......... B60C 1/00 525/271 |
| 2005/0159554 A1 * | 7/2005 | Endou et al. | ................. 525/242 |
| 2011/0146877 A1 * | 6/2011 | Tanaka et al. | ................ 152/547 |

FOREIGN PATENT DOCUMENTS

| | | |
|---|---|---|
| EP | 2 266 819 A1 | 12/2010 |
| JP | 10-007702 | 1/1998 |
| WO | WO 2009/113546 | * 9/2009 |
| WO | WO-2009/113546 A1 | 9/2009 |

OTHER PUBLICATIONS

Office Action issued in Chinese Patent Application No. 201210086003.2 dated Jun. 25, 2015.

* cited by examiner

*Primary Examiner* — Roberto Rabago
(74) *Attorney, Agent, or Firm* — Foley & Lardner LLP

(57) ABSTRACT

An object of the present invention is to provide a process for producing a modified conjugated diene-based polymer suitable for preparing a polymer composition excellent in the fuel cost saving effect. The present invention provides a process for producing a modified conjugated diene-based polymer, comprising reacting a conjugated diene-based polymer having a monomer unit based on a conjugated diene compound and a monomer unit based on a compound represented by the following formula (1), with an organometallic compound, and reacting the resulting reaction product with a hydrocarbyloxysilane compound:

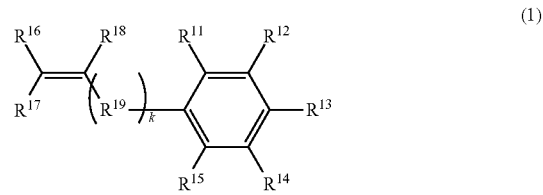

(1)

wherein $R^{11}$, $R^{12}$, $R^{13}$, $R^{14}$ and $R^{15}$ each represent a hydrogen atom or an alkyl group, at least one of $R^{11}$, $R^{12}$, $R^{13}$, $R^{14}$ and $R^{15}$ is an alkyl group, $R^{16}$, $R^{17}$ and $R^{18}$ each represent a hydrogen atom or a hydrocarbyl group, $R^{19}$ represents a hydrocarbylene group, and k represents 0 or 1.

6 Claims, No Drawings

PROCESS FOR PRODUCING MODIFIED CONJUGATED DIENE-BASED POLYMER, MODIFIED CONJUGATED DIENE-BASED POLYMER, AND POLYMER COMPOSITION

BACKGROUND OF THE INVENTION

1. Field of the Invention

The present invention is filed claiming the priority of Japanese Patent Application No. 2011-078767 filed on Mar. 31, 2011 under the Paris Convention, the entire content of which is incorporated herein by reference.

The present invention relates to a process for producing a modified conjugated diene-based polymer, a modified conjugated diene-based polymer, and a polymer composition.

2. Description of Related Art

In recent years, with an increase of interest in the environmental problems, fuel cost saving has been strongly required on automobiles, and a rubber composition used in tires for automobiles is also required to be excellent in the fuel cost saving effect. As the rubber composition for tires for use in automobiles, a rubber composition containing a conjugated diene-based polymer such as polybutadiene or a styrene-butadiene copolymer, and a reinforcing agent has been used. Use of a silica reinforcing agent in place of carbon black, which has previously been used as a reinforcing agent, has been studied in order to improve performance as a rubber composition for tires.

Since the silica reinforcing agent has lower affinity with the conjugated diene-based polymer as compared with carbon black, it is necessary to enhance affinity between the silica reinforcing agent and the conjugated diene-based polymer in order to enhance the fuel cost saving effect. In order to enhance affinity between the silica reinforcing agent and the conjugated diene-based polymer, for example, JP-A-10-7702 proposes a method of polymerizing isoprene and butadiene as monomer components using n-butyllithium, reacting the resulting polymer with n-butyllithium to perform metallization, and thereafter, reacting the resultant with chloropropyltriethoxysilane to obtain a modified conjugated diene-based polymer.

SUMMARY OF THE INVENTION

However, a rubber composition containing the modified conjugated diene-based polymer produced by the above-mentioned process is not sufficiently satisfactory in the fuel cost saving effect.

Under such a circumstance, an object to be achieved by the present invention is to provide a process for producing a modified conjugated diene-based polymer suitable for preparing a polymer composition excellent in the fuel cost saving effect.

The present invention relates to a process for producing a modified conjugated diene-based polymer, comprising reacting a conjugated diene-based polymer having a monomer unit based on a conjugated diene compound and a monomer unit based on a compound represented by the following formula (1) with an organometallic compound, and reacting the resulting reaction product with a hydrocarbyloxysilane compound:

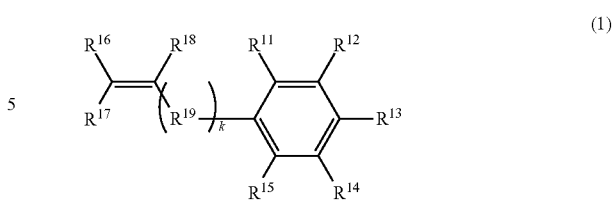

wherein $R^{11}$, $R^{12}$, $R^{13}$, $R^{14}$ and $R^{15}$ each represent a hydrogen atom or an alkyl group, at least one of $R^{11}$, $R^{12}$, $R^{13}$, $R^{14}$ and $R^{15}$ is an alkyl group, $R^{16}$, $R^{17}$ and $R^{18}$ each represent a hydrogen atom or a hydrocarbyl group, $R^{19}$ represents a hydrocarbylene group, and k represents 0 or 1.

A second aspect of the present invention relates to a modified conjugated diene-based polymer produced by the above-mentioned process.

A third aspect of the present invention relates to a polymer composition containing the above-mentioned modified conjugated diene-based polymer and a reinforcing agent, wherein the content of the reinforcing agent is 10 parts by weight to 150 parts by weight per the content of 100 parts by weight of the modified conjugated diene-based polymer.

According to the present invention, a modified conjugated diene-based polymer suitable for preparing a polymer composition excellent in the fuel cost saving effect can be provided.

DETAILED DESCRIPTION OF THE INVENTION

In the present specification, a hydrocarbyl group represents a monovalent group obtained by removing one hydrogen atom from a hydrocarbon. A hydrocarbylene group represents a divalent group obtained by removing two hydrogen atoms from a hydrocarbon. A hydrocarbyloxy group represents a monovalent group having a structure in which a hydrogen atom of a hydroxy group is substituted with a hydrocarbyl group. A substituted amino group represents a group having a structure in which at least one hydrogen atom of an amino group is substituted with a monovalent atom or a monovalent group other than a hydrogen atom, or a group having a structure in which two hydrogen atoms of an amino group are substituted with a divalent group. A hydrocarbyl group having a substituent (hereinafter, sometimes referred to as a substituted hydrocarbyl group) represents a monovalent group having a structure in which at least one hydrogen atom of a hydrocarbyl group is substituted with a substituent. A hydrocarbylene group having a heteroatom (hereinafter, sometimes referred to as a heteroatom-containing hydrocarbylene group) represents a divalent group having a structure in which a carbon atom other than a carbon atom from which a hydrogen atom has been removed, and/or a hydrogen atom, of a hydrocarbylene group is substituted with a group having a heteroatom (an atom other than a carbon atom and a hydrogen atom). A hydrocarbyloxysilane compound represents a compound having a structure in which at least one hydrocarbyloxy group is bound to a silicon atom.

[Process for Producing Modified Conjugated Diene-Based Polymer]

A process for producing a modified conjugated diene-based polymer of the present invention is a process for producing a modified conjugated diene-based polymer, comprising reacting a conjugated diene-based polymer having a monomer unit based on a conjugated diene compound and a monomer unit based on a compound represented by the following formula (1) with an organometallic compound, and reacting the resulting reaction product with a hydrocarbyloxysilane compound:

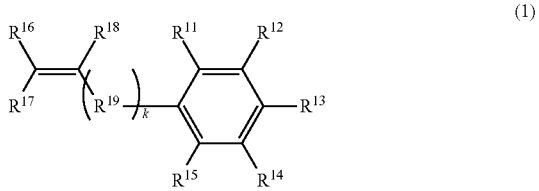

wherein $R^{11}$, $R^{12}$, $R^{13}$, $R^{14}$ and $R^{15}$ each represent a hydrogen atom or an alkyl group, at least one of $R^{11}$, $R^{12}$, $R^{13}$, $R^{14}$ and $R^{15}$ is an alkyl group, $R^{16}$, $R^{17}$ and $R^{18}$ each represent a hydrogen atom or a hydrocarbyl group, $R^{19}$ represents a hydrocarbylene group, and k represents 0 or 1.

<Conjugated Diene-Based Polymer>

Examples of the conjugated diene compound include 1,3-butadiene, isoprene, 1,3-pentadiene, 2,3-dimethyl-1,3-butadiene, and 1,3-hexadiene. One or more kinds of them are used. Preferable is 1,3-butadiene or isoprene.

In the formula (1), $R^{11}$, $R^{12}$, $R^{13}$, $R^{14}$ and $R^{15}$ each represent a hydrogen atom or an alkyl group, and at least one of $R^{11}$, $R^{12}$, $R^{13}$, $R^{14}$ and $R^{15}$ is an alkyl group.

The number of carbon atoms of an alkyl group of $R^{11}$, $R^{12}$, $R^{13}$, $R^{14}$ and $R^{15}$ is preferably 1 to 8, more preferably 1 to 5, further preferably 1 to 2, particularly preferably 1.

Examples of the alkyl group of $R^{11}$, $R^{12}$, $R^{13}$, $R^{14}$ and $R^{15}$ include a methyl group, an ethyl group, a propyl group, an isopropyl group, a butyl group, an isobutyl group, a sec-butyl group, a pentyl group, a hexyl group, a heptyl group, and an octyl group.

The alkyl group of $R^{11}$, $R^{12}$, $R^{13}$, $R^{14}$ and $R^{15}$ is preferably an alkyl group which is bound to a benzene ring with a carbon atom to which one or more hydrogen atoms are bound, more preferably an alkyl group which is bound to a benzene ring with a carbon atom to which two or more hydrogen atoms are bound, further preferably a linear alkyl group.

The alkyl group of $R^{11}$, $R^{12}$, $R^{13}$, $R^{14}$ and $R^{15}$ is preferably a methyl group, an ethyl group, an n-propyl group, an n-butyl group, or an n-pentyl group, more preferably a methyl group or an ethyl group, further preferably a methyl group.

Preferably, one to three of $R^{11}$, $R^{12}$, $R^{13}$, $R^{14}$ and $R^{15}$ are alkyl group(s), and the remainder is hydrogen atoms. More preferably, one or two of $R^{11}$, $R^{12}$, $R^{13}$, $R^{14}$ and $R^{15}$ are alkyl group(s), and the remainder is hydrogen atoms.

When one of $R^{11}$, $R^{12}$, $R^{13}$, $R^{14}$ and $R^{15}$ is an alkyl group and the remaining four are hydrogen atoms, preferably, any one of $R^{12}$, $R^{13}$ and $R^{14}$ is an alkyl group and the remaining four are hydrogen atoms.

When two of $R^{11}$, $R^{12}$, $R^{13}$, $R^{14}$ and $R^{15}$ are alkyl group(s) and the remaining three are hydrogen atoms, preferably, $R^{11}$ and $R^{13}$ are alkyl groups and $R^{12}$, $R^{14}$ and $R^{15}$ are hydrogen atoms, or $R^{11}$ and $R^{14}$ are alkyl groups and $R^{12}$, $R^{13}$ and $R^{15}$ are hydrogen atoms, or $R^{12}$ and $R^{14}$ are alkyl groups and $R^{11}$, $R^{13}$ and $R^{15}$ are hydrogen atoms.

When three of $R^{11}$, $R^{12}$, $R^{13}$, $R^{14}$ and $R^{15}$ are alkyl groups and the remaining two are hydrogen atoms, preferably, $R^{11}$, $R^{13}$ and $R^{15}$ are alkyl groups and $R^{12}$ and $R^{14}$ are hydrogen atoms.

In the formula (1), $R^{16}$, $R^{17}$ and $R^{18}$ each represent a hydrogen atom or a hydrocarbyl group. Examples of the hydrocarbyl group include an alkyl group, an alkenyl group, an aryl group, and an arylalkyl group. Examples of the alkyl group include a methyl group, an ethyl group, an n-propyl group, an isopropyl group, a butyl group, an isobutyl group, a sec-butyl group, a tert-butyl group, an n-pentyl group, an n-hexyl group, an n-heptyl group, and an n-octyl group. Examples of the alkenyl group include a vinyl group, a 1-propenyl group, 2-propenyl group, an isopropenyl group, and a 1-butenyl group. Examples of the aryl group include a phenyl group, a tolyl group, a xylyl group, and a naphthyl group. Examples of the arylalkyl group include a benzyl group and a 2-phenyl-1-ethyl group.

When $R^{16}$ and $R^{17}$ are hydrocarbyl groups, $R^{16}$ and $R^{17}$ are preferably alkyl groups or alkenyl groups, more preferably alkenyl groups. When $R^{18}$ is a hydrocarbyl group, $R^{18}$ is preferably an alkyl group, an alkenyl group, or an aryl group.

When $R^{16}$, $R^{17}$ and $R^{18}$ are hydrocarbyl groups, the number of carbon atoms of $R^{16}$, $R^{17}$ and $R^{18}$ is preferably 1 to 10. When $R^{16}$, $R^{17}$ and $R^{18}$ are alkyl groups, the number of carbon atoms of $R^{16}$, $R^{17}$ and $R^{18}$ is more preferably 1 to 6, further preferably 1 to 2; when $R^{16}$, $R^{17}$ and $R^{18}$ are alkenyl groups, the number of carbon atoms of $R^{16}$, $R^{17}$ and $R^{18}$ is more preferably 2 to 6, further preferably 2; and when $R^{16}$, $R^{17}$ and $R^{18}$ are aryl groups, the number of carbon atoms of $R^{16}$, $R^{17}$ and $R^{18}$ is more preferably 6 to 8.

$R^{16}$ and $R^{17}$ are preferably hydrogen atoms or alkenyl groups having 2 to 6 carbon atoms, more preferably hydrogen atoms or vinyl groups, further preferably hydrogen atoms.

$R^{18}$ is preferably a hydrogen atom, an alkyl group having 1 to 6 carbon atoms, an alkenyl group having 2 to 6 carbon atoms, or an aryl group having 6 to 8 carbon atoms, more preferably a hydrogen atom, a methyl group, a vinyl group, or a phenyl group, further preferably a hydrogen atom.

In the formula (1), k represents 0 or 1, preferably 0.

In the formula (1), $R^{19}$ represents a hydrocarbylene group. Examples of the hydrocarbylene group include an alkanediyl group and an arylene group. Examples of the alkanediyl group include a methylene group and a polymethylene group. Examples of the polymethylene group include an ethylene group, a trimethylene group, a tetramethylene group, a pentamethylene group, and a hexamethylene group. Examples of the arylene group include a phenylene group.

The number of carbon atoms of $R^{19}$ is preferably 1 to 8, more preferably 1 to 5, further preferably 1 to 3.

$R^{19}$ is preferably an alkanediyl group having 1 to 8 carbon atoms, more preferably a methylene group, or a polymethylene group having 2 to 5 carbon atoms, further preferably a methylene group, an ethylene group, or a trimethylene group.

Of the compounds represented by the formula (1), examples of a compound in which $R^{16}$, $R^{17}$ and $R^{18}$ are hydrogen atoms and k is 0 include the following compounds.

A compound in which two of $R^{11}$, $R^{12}$, $R^{13}$, $R^{14}$ and $R^{15}$ are alkyl groups and the remaining three are hydrogen atoms:

2,3-dimethylstyrene, 2,3-diethylstyrene, 2,3-dipropylstyrene, 2,3-dibutylstyrene, 2,3-dipentylstyrene, 2,3-dihexylstyrene, 2-methyl-3-ethylstyrene, 2-ethyl-3-methylstyrene, 2,4-dimethylstyrene, 2,4-diethylstyrene, 2,4-dipropylstyrene, 2,4-dibutylstyrene, 2,4-dipentylstyrene, 2,4-dihexylstyrene, 2-methyl-4-ethylstyrene, 2-ethyl-4-methylstyrene, 2,5-dimethylstyrene, 2,5-diethylstyrene, 2,5-dipropylstyrene, 2,5-dibutylstyrene, 2,5-dipentylstyrene, 2,5-dihexylstyrene, 2-methyl-5-ethylstyrene, 2-ethyl-5-methylstyrene, 2,6-dimethylstyrene, 2,6-diethylstyrene, 2,6-dipropylstyrene, 2,6-dibutylstyrene, 2,6-dipentylstyrene, 2,6-dihexylstyrene, 2-methyl-6-ethylstyrene, 2-ethyl-6-methylstyrene, 3,4-dimethylstyrene, 3,4-diethylstyrene, 3,4-dipropylstyrene, 3,4-dibutylstyrene, 3,4-dipentylstyrene, 3,4-dihexylstyrene, 3-methyl-4-ethylstyrene, 3-ethyl-4-methylstyrene, 3,5-dimethylstyrene, 3,5-diethylstyrene, 3,5-dipropylstyrene, 3,5-dibutylstyrene, 3,5-dipentylstyrene, 3,5-dihexylstyrene, 3-methyl-5-ethylstyrene, and 3-ethyl-5-methylstyrene.

A compound in which three of $R^{11}$, $R^{12}$, $R^{13}$, $R^{14}$ and $R^{15}$ are alkyl groups and the remaining two are hydrogen atoms:
2,3,4-trimethylstyrene, 2,3,4-triethylstyrene, 2,3,4-tri-propylstyrene,
2,3,4-tri-butylstyrene, 2,3,4-tri-pentylstyrene, 2,3,4-trihexylstyrene,
2,3,5-trimethylstyrene, 2,3,5-triethylstyrene, 2,3,5-tripropylstyrene,
2,3,5-tributylstyrene, 2,3,5-tripentylstyrene, 2,3,5-trihexylstyrene,
2,3,6-trimethylstyrene, 2,3,6-triethylstyrene, 2,3,6-tripropylstyrene,
2,3,6-tributylstyrene, 2,3,6-tripentylstyrene, 2,3,6-trihexylstyrene,
2,4,5-trimethylstyrene, 2,4,5-triethylstyrene, 2,4,5-tripropylstyrene,
2,4,5-tributylstyrene, 2,4,5-tripentylstyrene, 2,4,5-trihexylstyrene,
2,4,6-trimethylstyrene, 2,4,6-triethylstyrene, 2,4,6-tripropylstyrene,
2,4,6-tributylstyrene, 2,4,6-tripentylstyrene, 2,4,6-trihexylstyrene,
3,4,5-trimethylstyrene, 3,4,5-triethylstyrene, 3,4,5-tripropylstyrene,
3,4,5-tributylstyrene, 3,4,5-tripentylstyrene, and 3,4,5-trihexylstyrene.

Of the compounds represented by the formula (1), examples of the compound in which $R^{16}$, $R^{17}$ and $R^{18}$ are hydrogen atoms, k is 1, and $R^{19}$ is a methylene group include the following compounds.

A compound in which one of $R^{11}$, $R^{12}$, $R^{13}$, $R^{14}$ and $R^{15}$ is an alkyl group and the remaining four are hydrogen atoms:
2-methyl-1-(2-propenyl)benzene, 2-ethyl-1-(2-propenyl)benzene,
2-propyl-1-(2-propenyl)benzene, 2-butyl-1-(2-propenyl)benzene,
3-methyl-1-(2-propenyl)benzene, 3-ethyl-1-(2-propenyl)benzene,
3-propyl-1-(2-propenyl)benzene, 3-butyl-1-(2-propenyl)benzene,
4-methyl-1-(2-propenyl)benzene, 4-ethyl-1-(2-propenyl)benzene,
4-propyl-1-(2-propenyl)benzene, and 4-butyl-1-(2-propenyl)benzene.

A compound in which two of $R^{11}$, $R^{12}$, $R^{13}$, $R^{14}$ and $R^{15}$ are alkyl groups having 1 to 8 carbon atoms and the remaining three are hydrogen atoms:
2,3-dimethyl-1-(2-propenyl)benzene, 2,3-diethyl-1-(2-propenyl)benzene,
2,3-dipropyl-1-(2-propenyl)benzene, 2,3-dibutyl-1-(2-propenyl)benzene,
2,4-dimethyl-1-(2-propenyl)benzene, 2,4-diethyl-1-(2-propenyl)benzene,
2,4-dipropyl-1-(2-propenyl)benzene, 2,4-dibutyl-1-(2-propenyl)benzene,
2,5-dimethyl-1-(2-propenyl)benzene, 2,5-diethyl-1-(2-propenyl)benzene,
2,5-dipropyl-1-(2-propenyl)benzene, 2,5-dibutyl-1-(2-propenyl)benzene,
2,6-dimethyl-1-(2-propenyl)benzene, 2,6-diethyl-1-(2-propenyl)benzene,
2,6-dipropyl-1-(2-propenyl)benzene, 2,6-dibutyl-1-(2-propenyl)benzene,
3,4-dimethyl-1-(2-propenyl)benzene, 3,4-diethyl-1-(2-propenyl)benzene,
3,4-dipropyl-1-(2-propenyl)benzene, 3,4-dibutyl-1-(2-propenyl)benzene,
3,5-dimethyl-1-(2-propenyl)benzene, 3,5-diethyl-1-(2-propenyl)benzene,
3,5-dipropyl-1-(2-propenyl)benzene, and 3,5-dibutyl-1-(2-propenyl)benzene.

A compound in which three of $R^{11}$, $R^{12}$, $R^{13}$, $R^{14}$ and $R^{15}$ are alkyl groups and the remaining two are hydrogen atoms:
2,3,4-trimethyl-1-(2-propenyl)benzene, 2,3,4-triethyl-1-(2-propenyl)benzene,
2,3,5-trimethyl-1-(2-propenyl)benzene, 2,3,5-triethyl-1-(2-propenyl)benzene,
2,3,6-trimethyl-1-(2-propenyl)benzene, 2,3,6-triethyl-1-(2-propenyl)benzene,
2,4,5-trimethyl-1-(2-propenyl)benzene, 2,4,5-triethyl-1-(2-propenyl)benzene,
2,4,6-trimethyl-1-(2-propenyl)benzene, 2,4,6-triethyl-1-(2-propenyl)benzene,
3,4,5-trimethyl-1-(2-propenyl)benzene, and
3,4,5-triethyl-1-(2-propenyl)benzene.

Of the compounds represented by the formula (1), examples of the compound in which $R^{16}$, $R^{17}$ and $R^{18}$ are hydrogen atoms, k is 1, and $R^{19}$ is an ethylene group include the following compounds.

A compound in which one of $R^{11}$, $R^{12}$, $R^{13}$, $R^{14}$ and $R^{15}$ is an alkyl group and the remaining four are hydrogen atoms:
2-methyl-1-(3-butenyl)benzene, 2-ethyl-1-(3-butenyl)benzene,
2-propyl-1-(3-butenyl)benzene, 2-butyl-1-(3-butenyl)benzene,
3-methyl-1-(3-butenyl)benzene, 3-ethyl-1-(3-butenyl)benzene,
3-propyl-1-(3-butenyl)benzene, 3-butyl-1-(3-butenyl)benzene,
4-methyl-1-(3-butenyl)benzene, 4-ethyl-1-(3-butenyl)benzene,
4-propyl-1-(3-butenyl)benzene, and 4-butyl-1-(3-butenyl)benzene.

A compound in which two of $R^{11}$, $R^{12}$, $R^{13}$, $R^{14}$ and $R^{15}$ are alkyl groups and the remaining three are hydrogen atoms:
2,3-dimethyl-1-(3-butenyl)benzene, 2,3-diethyl-1-(3-butenyl)benzene,
2,3-dipropyl-1-(3-butenyl)benzene, 2,3-dibutyl-1-(3-butenyl)benzene,
2,4-dimethyl-1-(3-butenyl)benzene, 2,4-diethyl-1-(3-butenyl)benzene,
2,4-dipropyl-1-(3-butenyl)benzene, 2,4-dibutyl-1-(3-butenyl)benzene,
2,5-dimethyl-1-(3-butenyl)benzene, 2,5-diethyl-1-(3-butenyl)benzene,
2,5-dipropyl-1-(3-butenyl)benzene, 2,5-dibutyl-1-(3-butenyl)benzene,
2,6-dimethyl-1-(3-butenyl)benzene, 2,6-diethyl-1-(3-butenyl)benzene,
2,6-dipropyl-1-(3-butenyl)benzene, 2,6-dibutyl-1-(3-butenyl)benzene, 3,4-dimethyl-1-(3-butenyl)benzene, 3,4-diethyl-1-(3-butenyl)benzene,
3,4-dipropyl-1-(3-butenyl)benzene, 3,4-dibutyl-1-(3-butenyl)benzene,
3,5-dimethyl-1-(3-butenyl)benzene, 3,5-diethyl-1-(3-butenyl)benzene,
3,5-dipropyl-1-(3-butenyl)benzene, and 3,5-dibutyl-1-(3-butenyl)benzene.

A compound in which three of $R^{11}$, $R^{12}$, $R^{13}$, $R^{14}$ and $R^{15}$ are alkyl groups and the remaining two are hydrogen atoms:
2,3,4-trimethyl-1-(3-butenyl)benzene, 2,3,4-triethyl-1-(3-butenyl)benzene,
2,3,5-trimethyl-1-(3-butenyl)benzene, 2,3,5-triethyl-1-(3-butenyl)benzene,
2,3,6-trimethyl-1-(3-butenyl)benzene, 2,3,6-triethyl-1-(3-butenyl)benzene,
2,4,5-trimethyl-1-(3-butenyl)benzene, 2,4,5-triethyl-1-(3-butenyl)benzene,
2,4,6-trimethyl-1-(3-butenyl)benzene, 2,4,6-triethyl-1-(3-butenyl)benzene,
3,4,5-trimethyl-1-(3-butenyl)benzene, and
3,4,5-triethyl-1-(3-butenyl)benzene.

Of the compounds represented by the formula (1), examples of a compound in which $R^{16}$, $R^{17}$ and $R^{18}$ are hydrogen atoms, k is 1, and $R^{19}$ is a trimethylene group include the flowing compounds.

A compound in which one of $R^{11}$, $R^{12}$, $R^{13}$, $R^{14}$ and $R^{15}$ is an alkyl group and the remaining four are hydrogen atoms:
2-methyl-1-(4-pentenyl)benzene, 2-ethyl-1-(4-pentenyl)benzene,
2-propyl-1-(4-pentenyl)benzene, 2-butyl-1-(4-pentenyl)benzene,
3-methyl-1-(4-pentenyl)benzene, 3-ethyl-1-(4-pentenyl)benzene,
3-propyl-1-(4-pentenyl)benzene, 3-butyl-1-(4-pentenyl)benzene,
4-methyl-1-(4-pentenyl)benzene, 4-ethyl-1-(4-pentenyl)benzene,
4-propyl-1-(4-pentenyl)benzene, and 4-butyl-1-(4-pentenyl)benzene.

A compound in which two of $R^{11}$, $R^{12}$, $R^{13}$, $R^{14}$ and $R^{15}$ are alkyl groups and the remaining three are hydrogen atoms:
2,3-dimethyl-1-(4-pentenyl)benzene, 2,3-diethyl-1-(4-pentenyl)benzene,
2,3-dipropyl-1-(4-pentenyl)benzene, 2,3-dibutyl-1-(4-pentenyl)benzene,
2,4-dimethyl-1-(4-pentenyl)benzene, 2,4-diethyl-1-(4-pentenyl)benzene,
2,4-dipropyl-1-(4-pentenyl)benzene, 2,4-dibutyl-1-(4-pentenyl)benzene,
2,5-dimethyl-1-(4-pentenyl)benzene, 2,5-diethyl-1-(4-pentenyl)benzene,
2,5-dipropyl-1-(4-pentenyl)benzene, 2,5-dibutyl-1-(4-pentenyl)benzene,
2,6-dimethyl-1-(4-pentenyl)benzene, 2,6-diethyl-1-(4-pentenyl)benzene,
2,6-dipropyl-1-(4-pentenyl)benzene, 2,6-dibutyl-1-(4-pentenyl)benzene,
3,4-dimethyl-1-(4-pentenyl)benzene, 3,4-diethyl-1-(4-pentenyl)benzene,
3,4-dipropyl-1-(4-pentenyl)benzene, 3,4-dibutyl-1-(4-pentenyl)benzene,
3,5-dimethyl-1-(4-pentenyl)benzene, 3,5-diethyl-1-(4-pentenyl)benzene,
3,5-dipropyl-1-(4-pentenyl)benzene, and 3,5-dibutyl-1-(4-pentenyl)benzene.

A compound in which three of $R^{11}$, $R^{12}$, $R^{13}$, $R^{14}$ and $R^{15}$ are alkyl groups and the remaining two are hydrogen atoms:
2,3,4-trimethyl-1-(4-pentenyl)benzene, 2,3,4-triethyl-1-(4-pentenyl)benzene,
2,3,5-trimethyl-1-(4-pentenyl)benzene, 2,3,5-triethyl-1-(4-pentenyl)benzene,
2,3,6-trimethyl-1-(4-pentenyl)benzene, 2,3,6-triethyl-1-(4-pentenyl)benzene,
2,4,5-trimethyl-1-(4-pentenyl)benzene, 2,4,5-triethyl-1-(4-pentenyl)benzene,
2,4,6-trimethyl-1-(4-pentenyl)benzene, 2,4,6-triethyl-1-(4-pentenyl)benzene,
3,4,5-trimethyl-1-(4-pentenyl)benzene, and
3,4,5-triethyl-1-(4-pentenyl)benzene.

Of the compounds represented by the formula (1), examples of a compound in which $R^{16}$ and $R^{17}$ are hydrogen atoms, $R^{18}$ is a methyl group, and k is 0 include the following compounds.

A compound in which one of $R^{11}$, $R^{12}$, $R^{13}$, $R^{14}$ and $R^{15}$ is an alkyl group and the remaining four are hydrogen atoms:
2-methyl-1-isopropenylbenzene, 2-ethyl-1-isopropenylbenzene,
2-propyl-1-isopropenylbenzene, 2-butyl-1-isopropenylbenzene,
3-methyl-1-isopropenylbenzene, 3-ethyl-1-isopropenylbenzene,
3-propyl-1-isopropenylbenzene, 3-butyl-1-isopropenylbenzene,
4-methyl-1-isopropenylbenzene, 4-ethyl-1-isopropenylbenzene,
4-propyl-1-isopropenylbenzene, and 4-butyl-1-isopropenylbenzene.

Of the compounds represented by the formula (1), examples of a compound in which $R^{16}$ and $R^{17}$ are hydrogen atoms, $R^{18}$ is a vinyl group, and k is 0 include the following compounds.

A compound in which one of $R^{11}$, $R^{12}$, $R^{13}$, $R^{14}$ and $R^{15}$ is an alkyl group and the remaining four are hydrogen atoms:
2-(2-methylphenyl)-1,3-butadiene, 2-(2-ethylphenyl)-1,3-butadiene,
2-(2-propylphenyl)-1,3-butadiene, 2-(2-butylphenyl)-1,3-butadiene,
2-(3-methylphenyl)-1,3-butadiene, 2-(3-ethylphenyl)-1,3-butadiene,
2-(3-propylphenyl)-1,3-butadiene, 2-(3-butylphenyl)-1,3-butadiene,
2-(4-methylphenyl)-1,3-butadiene, 2-(4-ethylphenyl)-1,3-butadiene,
2-(4-propylphenyl)-1,3-butadiene, and 2-(4-butylphenyl)-1,3-butadiene.

Of the compounds represented by the formula (1), examples of the compound in which $R^{16}$ and $R^{17}$ are hydrogen atoms, $R^{18}$ is a vinyl group, k is 1, and $R^{19}$ is a methylene group include the following compounds.

A compound in which one of $R^{11}$, $R^{12}$, $R^{13}$, $R^{14}$ and $R^{15}$ is an alkyl group and the remaining four are hydrogen atoms:
2-(2-methylphenyl)methyl-1,3-butadiene,
2-(2-ethylphenyl)methyl-1,3-butadiene,
2-(2-propylphenyl)methyl-1,3-butadiene,
2-(2-butylphenyl)methyl-1,3-butadiene,
2-(3-methylphenyl)methyl-1,3-butadiene,
2-(3-ethylphenyl)methyl-1,3-butadiene,
2-(3-propylphenyl)methyl-1,3-butadiene,
2-(3-butylphenyl)methyl-1,3-butadiene,
2-(4-methylphenyl)methyl-1,3-butadiene,
2-(4-ethylphenyl)methyl-1,3-butadiene,
2-(4-propylphenyl)methyl-1,3-butadiene, and
2-(4-butylphenyl)methyl-1,3-butadiene.

Of the compounds represented by the formula (1), examples of the compound in which $R^{16}$ and $R^{17}$ are hydrogen atoms, $R^{18}$ is a vinyl group, k is 1, and $R^{19}$ is an ethylene group include the following compounds.

A compound in which one of $R^{11}$, $R^{12}$, $R^{13}$, $R^{14}$ and $R^{15}$ is an alkyl group and the remaining four are hydrogen atoms:
2-[2-(2-methylphenyl)ethyl]-1,3-butadiene,
2-[2-(2-ethylphenyl)ethyl]-1,3-butadiene,
2-[2-(2-propylphenyl)ethyl]-1,3-butadiene,
2-[2-(2-butylphenyl)ethyl]-1,3-butadiene,
2-[2-(3-methylphenyl)ethyl]-1,3-butadiene,
2-[2-(3-ethylphenyl)ethyl]-1,3-butadiene,
2-[2-(3-propylphenyl)ethyl]-1,3-butadiene,
2-[2-(3-butylphenyl)ethyl]-1,3-butadiene,
2-[2-(4-methylphenyl)ethyl]-1,3-butadiene,
2-[2-(4-ethylphenyl)ethyl]-1,3-butadiene,
2-[2-(4-propylphenyl)ethyl]-1,3-butadiene, and
2-[2-(4-butylphenyl)ethyl]-1,3-butadiene.

Of the compounds represented by the formula (1), examples of a compound in which $R^{16}$ and $R^{17}$ are hydrogen atoms, $R^{18}$ is a vinyl group, k is 1, and $R^{19}$ is a trimethylene group include the following compounds.

A compound in which one of $R^{11}$, $R^{12}$, $R^{13}$, $R^{14}$ and $R^{15}$ is an alkyl group and the remaining four are hydrogen atoms:
2-[3-(2-methylphenyl)propyl]-1,3-butadiene,
2-[3-(2-ethylphenyl)propyl]-1,3-butadiene,
2-[3-(2-propylphenyl)propyl]-1,3-butadiene,
2-[3-(2-butylphenyl)propyl]-1,3-butadiene,
2-[3-(3-methylphenyl)propyl]-1,3-butadiene,
2-[3-(3-ethylphenyl)propyl]-1,3-butadiene,
2-[3-(3-propylphenyl)propyl]-1,3-butadiene,
2-[3-(3-butylphenyl)propyl]-1,3-butadiene,
2-[3-(4-methylphenyl)propyl]-1,3-butadiene,
2-[3-(4-ethylphenyl)propyl]-1,3-butadiene,
2-[3-(4-propylphenyl)propyl]-1,3-butadiene, and
2-[3-(4-butylphenyl)propyl]-1,3-butadiene.

Of the compounds represented by the formula (1), examples of a compound in which $R^{16}$ and $R^{17}$ are hydrogen atoms, $R^{18}$ is a phenyl group, and k is 0 include the following compounds.

A compound in which one of $R^{11}$, $R^{12}$, $R^{13}$, $R^{14}$ and $R^{15}$ is an alkyl group and the remaining four are hydrogen atoms:
1-(2-methylphenyl)-1-phenylethylene, 1-(2-ethylphenyl)-1-phenylethylene,
1-(2-propylphenyl)-1-phenylethylene, 1-(2-butylphenyl)-1-phenylethylene,
1-(3-methylphenyl)-1-phenylethylene, 1-(3-ethylphenyl)-1-phenylethylene,
1-(3-propylphenyl)-1-phenylethylene, 1-(3-butylphenyl)-1-phenylethylene,
1-(4-methylphenyl)-1-phenylethylene, 1-(4-ethylphenyl)-1-phenylethylene,
1-(4-propylphenyl)-1-phenylethylene, and
1-(4-butylphenyl)-1-phenylethylene.

Of the compounds represented by the formula (1), examples of a compound in which $R^{16}$ and $R^{17}$ are hydrogen atoms, $R^{18}$ is a 4-tolyl group, and k is 0 include the following compounds.

A compound in which one of $R^{11}$, $R^{12}$, $R^{13}$, $R^{14}$ and $R^{15}$ is an alkyl group and the remaining four are hydrogen atoms:
1,1-bis(4-methylphenyl)ethylene, 1,1-bis(4-ethylphenyl)ethylene,
1,1-bis(4-propylphenyl)ethylene, and 1,1-bis(4-butylphenyl)ethylene.

Of the compounds represented by the formula (1), examples of a compound in which $R^{16}$ is a vinyl group, $R^{17}$ and $R^{18}$ are hydrogen atoms, and k is 0 include the following compounds.

A compound in which one of $R^{11}$, $R^{12}$, $R^{13}$, $R^{14}$ and $R^{15}$ is an alkyl group and the remaining four are hydrogen atoms:
1-(2-methylphenyl)-1,3-butadiene, 1-(2-ethylphenyl)-1,3-butadiene,
1-(2-propylphenyl)-1,3-butadiene, 1-(2-butylphenyl)-1,3-butadiene,
1-(3-methylphenyl)-1,3-butadiene, 1-(3-ethylphenyl)-1,3-butadiene,
1-(3-propylphenyl)-1,3-butadiene, 1-(3-butylphenyl)-1,3-butadiene,
1-(4-methylphenyl)-1,3-butadiene, 1-(4-ethylphenyl)-1,3-butadiene,
1-(4-propylphenyl)-1,3-butadiene, and 1-(4-butylphenyl)-1,3-butadiene.

The compound represented by the formula (1) is preferably a compound in which $R^{11}$, $R^{12}$, $R^{13}$, $R^{14}$ and $R^{15}$ are hydrogen atoms or alkyl groups having 1 to 8 carbon atoms, at least one of $R^{11}$, $R^{12}$, $R^{13}$, $R^{14}$ and $R^{15}$ is an alkyl group having 1 to 8 carbon atoms, $R^{16}$, $R^{17}$ and $R^{18}$ are hydrogen atoms, and k is 0. More preferable is a compound in which $R^{11}$, $R^{12}$, $R^{13}$, $R^{14}$ and $R^{15}$ are hydrogen atoms or alkyl groups having 1 to 5 carbon atoms, at least one of $R^{11}$, $R^{12}$, $R^{13}$, $R^{14}$ and $R^{15}$ is an alkyl group having 1 to 5 carbon atoms, which is bound to a benzene ring with a carbon atom with two or more of hydrogen atoms bound thereto, $R^{16}$, $R^{17}$ and $R^{18}$ are hydrogen atoms, and k is 0. Further preferable is a compound in which one to three of $R^{11}$, $R^{12}$, $R^{13}$, $R^{14}$ and $R^{15}$ are methyl group(s) or ethyl group(s), and the remainder is hydrogen atoms, $R^{16}$, $R^{17}$ and $R^{18}$ are hydrogen atoms, and k is 0. Particularly preferable is a compound in which one or two of $R^{11}$, $R^{12}$, $R^{13}$, $R^{14}$ and $R^{15}$ are methyl group(s) or ethyl group(s), and the remainder is hydrogen atoms, $R^{16}$, $R^{17}$ and $R^{18}$ are hydrogen atoms, and k is 0.

The compound represented by the formula (1) is most preferably 3-methylstyrene, 3-ethylstyrene, 4-methylstyrene, 4-ethylstyrene, 2,4-dimethylstyrene, 2,4-diethylstyrene, 2,5-dimethylstyrene, 2,5-diethylstyrene, 3,5-dimethylstyrene, or 3,5-diethylstyrene.

Two or more kinds of the compounds represented by the formula (1) may be used.

The content of the monomer unit based on the compound represented by the formula (1), letting the total amount of the monomer units contained in a conjugated diene-based polymer be 100% by weight, is preferably 0.01% by weight or more, more preferably 0.05% by weight or more, further preferably 0.1% by weight or more, in order to enhance the fuel cost saving effect, gripping properties and tensile strength at break. The content is preferably 1% by weight or less, more preferably 0.5% by weight or less, further preferably 0.3% by weight or less.

The conjugated diene-based polymer may contain a monomer unit based on an aromatic vinyl compound other than the monomer unit based on the compound represented by the formula (1). Examples of the aromatic vinyl compound include styrene, α-methylstyrene, and vinylnaphthalene, preferably styrene.

When the conjugated diene-based polymer contains a monomer unit based on the aromatic vinyl compound other than the compound represented by the formula (1), the content of the monomer unit based on the aromatic vinyl compound, letting the total amount of the monomer units contained in the conjugated diene-based polymer be 100% by weight, is preferably 10% by weight or more, more preferably 15% by weight or more. The content is preferably 50% by weight or less, more preferably 45% by weight or less.

The conjugated diene-based polymer may have a nitrogen atom-containing group on at least one of polymer chain ends. Examples of the nitrogen atom-containing group include a substituted amino group and a nitrogen-containing heterocyclic group.

<Process for Producing Conjugated Diene-Based Polymer>

The conjugated diene-based polymer is preferably a conjugated diene-based polymer obtained by polymerizing a monomer component containing a conjugated diene compound and a compound represented by the formula (1) in a hydrocarbon solvent using an organometallic compound.

The hydrocarbon solvent is a solvent which does not inactivate an organometallic compound. Examples of the hydrocarbon solvent include aliphatic hydrocarbons such as propane, butane, isobutane, pentane, isopentane and hexane; aromatic hydrocarbons such as benzene, toluene, xylene and ethylbenzene; and alicyclic hydrocarbons such as cyclopentane and cyclehexane. One or more kinds of them are used.

Polymerization of the monomer components may be performed in the presence of an agent for adjusting the amount of vinyl bonds of the monomer unit based on the conjugated diene compound, and an agent for adjusting distribution of the monomer unit based on the conjugated diene compound and the monomer unit based on a compound other than the conjugated diene compound in a conjugated diene-based polymer chain (hereinafter, collectively referred to as an "adjusting agent"). Examples of the adjusting agent include ether compounds, tertiary amines, phosphine compounds, alkali metal alkoxides, and alkali metal phenoxides. Examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, and ethylene glycol dibutyl ether; aliphatic triethers such as diethylene glycol diethyl ether and diethylene glycol dibutyl ether; and aromatic ethers such as diphenyl ether and anisole. Examples of the tertiary amine include triethylamine, tripropylamine, tributylamine, 1,1,2,2-tetramethylethylenediamine, N,N-diethylaniline, pyridine, and quinoline. Examples of the phosphine compound include trimethylphosphine, triethylphesphine, and triphenylphosphine. Examples of the alkali metal alkoxide include sodium-tert-butoxide, potassium-tert-butoxide, sodium-tert-pentoxide, and potassium-tert-pentoxide. Examples of the alkali metal phenoxide include sodium phenoxide and potassium phenoxide. One or more kinds of them can be used.

The amount of use of the compound represented by the formula (1) in polymerization of the monomer components, letting the total amount of use of the monomer components in polymerization be 100% by weight, is preferably 0.01% by weight or more, more preferably 0.05% by weight or more, further preferably 0.1% by weight or more, in order to enhance the fuel cost saving effect, gripping properties and tensile strength at break. The amount of use is preferably 1% by weight or less, more preferably 0.5% by weight or less, further preferably 0.3% by weight or less.

When the conjugated diene-based polymer contains a monomer unit based on an aromatic vinyl compound other than the compound represented by the formula (1), the amount of use of the aromatic vinyl compound used in polymerization, letting the total amount of use of the monomer units in polymerization be 100% by weight, is preferably 10% by weight or more, more preferably 15% by weight or more. The amount of use is preferably 50% by weight or less, more preferably 45% by weight or less.

Examples of the organometallic compound used for obtaining the conjugated diene-based polymer by polymerization of the monomer components include organoalkali metal compounds such as an organolithium compound, an organosodium compound, an organopotassium compound, an organorubidium compound, and an organocesium compound. Examples of the organolithium compound include a hydrocarbyllithium compound and a hydrocarbylenedilithium compound. Examples of the organosodium compound include sodium naphthalenide and sodium biphenylenide. Examples of the organopotassium compound include potassium naphthalenide.

Examples of the hydrocarbyllithium compound include alkyllithium compounds such as methyllithium, ethyllithium, propyllithium, isopropyllithium, n-butyllithium, isobutyllithium, sec-butyllithium, tert-butyllithium, tert-octyllithium, and n-decyllithium; aryllithium compounds such as phenyllithium, 2-naphthyllithium, and 2-butylphenyllithium; arylalkyllithium compounds such as 4-phenylbutyllithium; and cycloalkyllithium compounds such as cyclopentyllithium and cyclohexyllithium. The hydrocarbyllithium compound is preferably an alkyllithium compound, more preferably n-butyllithium or sec-butyllithium.

Examples of the hydrocarbylenedilithium compound include 1,4-dilithio-2-butene and 1,3-bis(1-lithio-1,3-dimethylpentyl)benzene.

The amount of use of the organometallic compound used in polymerization of the monomer components is preferably 0.01 mmol to 15 mmol per 100 g of the monomer components to be used in polymerization.

The conjugated diene-based polymer may be a conjugated diene-based polymer having a nitrogen atom-containing group on at least one of polymer chain ends. Examples of a process for producing the conjugated diene-based polymer include the following process (a) and process (b).

(a) A process for producing a conjugated diene-based polymer using an organometallic compound having a nitrogen atom-containing group, as an organometallic compound, in polymerization.

(b) A process of adding a modifying agent having a nitrogen atom-containing group to a polymerization solution containing a conjugated diene-based polymer obtained by polymerization, and reacting the modifying agent with an active end of the conjugated diene-based polymer.

Preferable examples of the conjugated diene-based polymer having a nitrogen atom-containing group on at least one of polymer chain ends include a conjugated diene-based polymer which is produced by using a hydrocarbyllithium compound, as an organolithium compound, in polymerization, and by adding a modifying agent having a nitrogen atom-containing group to the polymer solution containing a conjugated diene-based polymer obtained by polymerization so as to react an active end of the polymer chain with the modifying agent. A conjugated diene-based polymer composition is obtained which is excellent in gripping properties and fully satisfactory in tensile strength at break, by using the conjugated diene-based polymer obtained according to the method mentioned above.

Also preferable examples of the conjugated diene-based polymer having a nitrogen atom-containing group on at least one of polymer chain ends include a conjugated diene-based polymer which is produced by using an organometallic compound having a nitrogen atom-containing group, as an organometallic compound, in polymerization, and by adding an alcohol to the polymer solution containing a conjugated diene-based polymer obtained by polymerization so as to inactivate an active end of the polymer chain. A conjugated diene-based polymer composition is obtained which is excellent in gripping properties and fully satisfactory in tensile strength at break, by using the conjugated diene-based polymer obtained according to the method mentioned above.

Also preferable examples of the conjugated diene-based polymer having a nitrogen atom-containing group on at least one of polymer chain ends include a conjugated diene-based polymer which is produced by using an organoalkali metal compound having a nitrogen atom-containing group, as an organometallic compound, in polymerization, and by adding a modifying agent having a nitrogen atom-containing group to the polymer solution containing a conjugated diene-based polymer obtained by polymerization so as to react an active end of the polymer chain with the modifying agent.

In the process (a), examples of a preferable organo alkali metal compound having a nitrogen atom-containing group include a compound represented by the following formula (2):

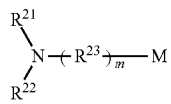

(2)

wherein M represents an alkali metal atom, $R^{21}$ and $R^{22}$ each represent a hydrocarbyl group optionally having a substituent, or a trihydrocarbylsilyl group, or $R^{21}$ and $R^{22}$ are bound to represent a hydrocarbylene group optionally having, as a heteroatom, a nitrogen atom and/or an oxygen atom, $R^{23}$ represents a hydrocarbylene group, and m represents 0 or 1.

In the formula (2), M represents an alkali metal atom. Examples of the alkali metal atom include Li, Na, K, Rb and Cs, preferably Li.

In the formula (2), $R^{21}$ and $R^{22}$ each represent a hydrocarbyl group optionally having a substituent, or a trihydrocarbylsilyl group, or $R^{21}$ and $R^{22}$ are bound to represent a hydrocarbylene group optionally having, as a heteroatom, a nitrogen atom and/or an oxygen atom.

In $R^{21}$ and $R^{22}$, the hydrocarbyl group optionally having a substituent is a hydrocarbyl group or a substituted hydrocarbyl group. Examples of the substituent in the substituted hydrocarbyl group include a substituted amino group and a hydrocarbyloxy group. Examples of the hydrocarbyl group include alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-octyl group, and an n-dodecyl group; cycloalkyl groups such as a cyclopentyl group and a cyclohexyl group; aryl groups such as a phenyl group and a toryl group; and aryl alkyl groups such as a benzyl group. Examples of the substituted hydrocarbyl group in which the substituent is a substituted amino group include a N,N-dimethylaminomethyl group, a 2-N,N-dimethylaminoethyl group, and a 3-N,N-dimethylaminopropyl group. Examples of the substituted hydrocarbyl group in which the substituent is a hydrocarbyloxy group include a methoxymethyl group, a methoxyethyl group, and an ethoxymethyl group.

Examples of the trihydrocarbylsilyl group of $R^{21}$ and $R^{22}$ include a trimethylsilyl group and a tert-butyl-dimethylsilyl group.

The hydrocarbylene group optionally having, as a heteroatom, a nitrogen atom and/or an oxygen atom, in which $R^{21}$ and $R^{22}$ are bound, is a hydrocarbylene group, or a heteroatom-containing hydrocarbylene group in which the heteroatom is a nitrogen atom and/or an oxygen atom. Examples of the heteroatom-containing hydrocarbylene group in which the heteroatom is a nitrogen atom and/or an oxygen atom include a heteroatom-containing hydrocarbylene group in which the heteroatom is a nitrogen atom and a heteroatom-containing hydrocarbylene group in which the heteroatom is an oxygen atom. Examples of the hydrocarbylene group include an alkanediyl group and an alkenediyl group. Examples of the alkanediyl group include polymethylene groups such as a tetramethylene group, a pentamethylene group, and a hexamethylene group; and a 2,2,4-trimethylhexane-1,6-diyl group. Examples of the alkenediyl group include a pent-2-ene-1,5-diyl group. Examples of the heteroatom-containing hydrocarbylene group in which the heteroatom is a nitrogen atom include a group represented by —CH=N—CH=CH— and a group represented by —CH=N—CH$_2$—CH$_2$—. Examples of the heteroatom-containing hydrocarbylene group in which the heteroatom is an oxygen atom include a group represented by —CH$_2$—CH$_2$—O—CH$_2$—CH$_2$—.

When $R^{21}$ and $R^{22}$ are hydrocarbyl groups, the number of carbon atoms is preferably 1 to 10, respectively, more preferably 1 to 4, respectively. When $R^{21}$ and $R^{22}$ are bound to be a hydrocarbylene group, the number of carbon atoms is preferably 3 to 20, more preferably 4 to 7.

$R^{21}$ and $R^{22}$ are preferably hydrocarbyl groups, or $R^{21}$ and $R^{22}$ are bound to be a hydrocarbylene group, more preferably a linear alkyl group having 1 to 4 carbon atoms, or $R^{21}$ and $^{22}$ are bound to be a polymethylene group having 4 to 7 carbon atoms.

$R^{21}$ and $R^{22}$ are further preferably a methyl group or an ethyl group.

In the formula (2), $R^{23}$ represents a hydrocarbylene group. Examples of the hydrocarbylene group of $R^{23}$ include an alkanediyl group, an alkenediyl group, and an arylene group. Examples of the alkanediyl group include a methylene group; polymethylene groups such as an ethylene group, a trimethylene group, a tetramethylene group, and a pentamethylene group; and a 2,2,4-trimethylhexane-1,6-diyl group. Examples of the alkenediyl group include a but-2-ene-1,4-diyl group, a 2-methylbut-2-ene-1,4-diyl group, and a pent-2-ene-1,5-diyl group. Examples of the arylene group include a 1,2-phenylene group, a 1,3-phenylene group, a 1,4-phenylene group, a 1,3-naphthylene group and a 1,4-naphthylene group.

Examples of the hydrocarbylene group of $R^{23}$ include a group in which 1 to 10 structural units derived from the conjugated diene compound and an alkanediyl group are bound. Examples of such a group include a group in which 1 to 10 structural units derived from isoprene and a methylene group are bound, a group in which 1 to 10 structural units derived from isoprene and an ethylene group are bound, and a group in which 1 to 10 structural units derived from isoprene and a trimethylene group are bound. In the group in which 1 to 10 structural units derived from the conjugated diene compound and an alkanediyl group are bound, the conjugated diene compound is preferably isoprene and/or butadiene, the number of structural units derived from the conjugated diene compound is preferably 1 to 5, the alkanediyl group is preferably a methylene group or a polymethylene group, and the number of carbon atoms of the alkanediyl group is preferably 1 to 6, more preferably 2 to 4, further preferably 3.

The number of carbon atoms of a hydrocarbylene group of $R^{23}$ is preferably 1 to 100, more preferably 3 to 80, further preferably 7 to 60.

The hydrocarbylene group of $R^{23}$ is preferably a group in which 1 to 10 structural units derived from the conjugated diene compound and an alkanediyl group are bound, or an alkanediyl group, more preferably a group in which 1 to 10 structural units derived from the conjugated diene compound consisting of butadiene and/or isoprene, and a methylene group or a polymethylene group are bound, or a polymethylene group, further preferably a group in which 1 to 10 structural units derived from isoprene, and a polymethylene group having 2 to 4 carbon atoms are bound, particularly preferably a group in which 1 to 5 structural units derived from isoprene, and an ethylene group or a trimethylene group are bound.

In the formula (2), m represents 0 or 1, preferably 1.

Of the compounds represented by the formula (2), examples of a compound in which m is 0, and $R^{21}$ and $R^{22}$ are hydrocarbyl groups include lithium dialkylamides such as lithium dimethylamide, lithium diethylamide, lithium ethylmethylamide, lithium di-n-propylamide, lithium diisopropylamide, lithium di-n-butylamide, lithium diisobutylamide, lithium di-sec-butylamide, lithium di-tert-butylamide, lithium di-n-hexylamide, lithium di-n-octylamide, and lithium dicyclohexylamide; lithium alkylarylamides such as lithium phenylmethylamide and lithium phenylethylamide; and lithium diarylamides such as lithium diphenylamide.

Of the compounds represented by the formula (2), examples of a compound in which m is 0, and at least one of $R^{21}$ and $R^{22}$ is a substituted hydrocarbyl group include lithium di(alkoxyalkyl)amides such as lithium di(methoxymethyl)amide and lithium di(ethoxymethyl)amide; lithium bis(dialkylaminoalkyl)amides such as lithium bis(dimethylaminomethyl)amide; and trialkylsilylalkyl group-containing lithium amides such as trimethylsilylpropylmethylaminolithium.

Of the compounds represented by the formula (2), examples of a compound in which m is 0, and $R^{21}$ and $R^{22}$ are bound to be a hydrocarbylene group include lithium trimethyleneimide, lithium pyrrolidide, lithium piperidide, 2-methylpiperidinolithium, lithium hexamethyleneimide, lithium octamethyleneimide, lithium decamethyleneimide, lithium dodecamethyleneimide, 2-methylpiperidinolithium, 3-methylpiperidinolithium, 4-methylpiperidinolithium, 3,5-dimethylpiperidinolithium, and 1,2,3,6-tetrahydropyridyllithium.

Of the compounds represented by the formula (2), examples of a compound in which m is 0, and $R^{21}$ and $R^{22}$ are bound to be a hydrocarbylene group having a heteroatom include 1-imidazolyllithium, 4,5-dihydro-1-imidazolyllithium, and 4-morpholinolithium.

Of the compounds represented by the formula (2), examples of a compound in which m is 1, and $R^{21}$ and $R^{22}$ are hydrocarbyl groups include 2-(N,N-dimethylamino)ethyllithium, 2-(N,N-diethylamino)ethyllithium, 3-(N,N-dimethylamino)propyllithium, and 3-(N,N-diethylamino)propyllithium. Examples of the compound also include a compound obtained by reacting the above-mentioned compound with the conjugated diene compound in an amount of 1 mol to 10 mol per 1 mol of the relevant compound.

Of the compounds represented by the formula (2), examples of a compound in which m is 1, and $R^{21}$ and $R^{22}$ are bound to be a hydrocarbylene group include 3-(1-pyrrolidinyl)propyllithium, 3-pyroridynopropyllithium, 3-(1-hexamethyleneimino)propyllithium. Examples of the compound also include a compound obtained by reacting the above-mentioned compound with a conjugated diene compound in an amount of 1 mol to 10 mol per 1 mol of the relevant compound.

Of the compounds represented by the formula (2), examples of a compound in which m is 1, and $R^{21}$ and $R^{22}$ are bound to be a hydrocarbylene group having a heteroatom include 3-(4-morpholino)propyllithium, and 3-(1-imidazolyl)propyllithium. Examples of the compound also include a compound obtained by reacting the above-mentioned compound with a conjugated diene compound in an amount of 1 mol to 10 mol per 1 mol of the relevant compound.

The compound represented by the formula (2) is preferably a compound in which m is 1, $R^{23}$ is a group obtained by binding 1 to 10 structural units derived from a conjugated diene compound consisting of butadiene and/or isoprene with a methylene group or a polymethylene group, or a polymethylene group, and $R^{21}$ and $R^{22}$ are alkyl groups, more preferably a compound in which m is 1, $R^{23}$ is a group obtained by binding 1 to 10 structural units derived from isoprene, and a polymethylene group having 2 to 4 carbon atoms (provided that the methylene group and a nitrogen atom of the formula (2) are bound), and $R^{21}$ and $R^{22}$ are linear alkyl groups having 1 to 4 carbon atoms, or $R^{21}$ and $R^{22}$ are bound to be a polymethylene group having 4 to 7 carbon atoms, further preferably a compound in which m is 1, $R^{23}$ is a group obtained by binding 1 to 5 structural units derived from isoprene, and a trimethylene group (provided that the trimethylene group and a nitrogen atom of the formula (2) are bound), and $R^{21}$ and $R^{22}$ are linear alkyl groups having 1 to 4 carbon atoms.

The compound represented by the formula (2) is particularly preferably a compound obtained by reacting a compound selected from the group consisting of 2-(N,N-dimethylamino)ethyllithium, 2-(N,N-diethylamino)ethyllithium, 3-(N,N-dimethylamino)propyllithium, or 3-(N,N-diethylamino)propyllithium with isoprene in an amount of 1 mol to 5 mol per 1 mol of the relevant compound.

The compound represented by the formula (2) may be a compound produced in a solution containing monomer components.

Examples of the organometallic compound having a nitrogen atom-containing group, other than the compound of formula (2), include 2,2,5,5-tetramethyl-1-(3-lithiopropyl)-1-aza-2,5-disilacyclopentane, 2,2,5,5-tetramethyl-1-(2-lithioethyl)-1-aza-2,5-disilacyclopentane, bis(dimethylamino)methylsilylmethyllithium, bis(dimethylamino)phenylsilylmethyllithium, bis(diethylamino)methylsilylmethyllithium, and bis(diethylamino)phenylsilylmethyllithium.

In the process (a), the amount of use of an organoalkali metal compound having a nitrogen atom-containing group to be used in polymerization of monomer components is preferably 0.01 mmol to 15 mmol per 100 g of monomer components to be used in polymerization.

In the process (b), preferable examples of a modifying agent having a nitrogen atom-containing group include a compound represented by the following formula (3):

(3)

wherein $R^{31}$ and $R^{32}$ may be bound, or $R^{31}$ and $R^{34}$ may be bound, $R^{31}$ represents a hydrocarbyl group optionally having a substituent, or is bound with $R^{32}$ to represent a hydrocarbylene group optionally having a nitrogen atom and/or an oxygen atom as a heteroatom, or is bound with $R^{34}$ to represent a divalent group, $R^{32}$ represents a hydrocarbyl group optionally having a substituent, or is bound with $R^{31}$ to represent a hydrocarbylene group optionally having a nitrogen atom and/or an oxygen atom as a heteroatom, $R^{34}$ represents a hydrocarbyl group optionally having a substituent, or a hydrogen atom, or is bound with $R^{31}$ to represent a divalent group, $R^{33}$ represents a divalent group, and p represents 0 or 1.

In the formula (3), a hydrocarbyl group optionally having a substituent of $R^{31}$, $R^{32}$ and $R^{34}$ is a hydrocarbyl group or a substituted hydrocarbyl group. Examples of the substituted hydrocarbyl group include a substituted hydrocarbyl group in which the substituent is a hydrocarbyloxy group, and a substituted hydrocarbyl group in which the substituent is a substituted amino group. Examples of the hydrocarbyl group include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group. Examples of the substituted hydrocarbyl group in which the substituent is a hydrocarbyloxy group include hydrocarbyloxyalkyl groups such as a methoxymethyl group, an ethoxymethyl group, and an ethoxyethyl group. Examples of the substituted hydrocarbyl group in which the substituent is a substituted amino group include (N,N-dialkylamino)alkyl groups such as a 2-(N,N-dimethylamino)ethyl group, a 2-(N,N-diethylamino)ethyl group, a 3-(N,N-dimethylamino)propyl group, and a 3-(N,N-diethylamino)propyl group; (N,N-dialkylamino)aryl groups such as a 4-(N,N-dimethylamino)phenyl group, a 3-(N,N-dimethylamino)phenyl group, a 4-(N,N-diethylamino)phenyl group, and a 3-(N,N-diethylamino)phenyl group; (N,N-dialkylamino)alkylaryl groups such as a 4-(N,N-dimethylamino)methylphenyl group and a 4-(N,N-dimethylamino)ethylphenyl group; cyclic amino group-containing alkyl groups such as a 3-(1-pyrrolidinyl)propyl group, a 3-piperidinopropyl group, and a 3-(1-imidazolyl)propyl group; cyclic amino group-containing aryl groups such as a 4-(1-pyrrolidinyl)phenyl group, a 4-piperidinophenyl group, and a 4-(1-imidazolyl)phenyl group; and cyclic amino group-containing alkylaryl groups such as a 4-[2-(1-pyrrolidinyl)ethyl]phenyl group, a 4-(2-piperidinoethyl)phenyl group, and a 4-[2-(1-imidazolyl)ethyl]phenyl group.

In the formula (3), a hydrocarbylene group optionally having a nitrogen atom and/or an oxygen atom as a heteroatom, in which $R^{31}$ and $R^{32}$ are bound, is a hydrocarbylene group, or a heteroatom-containing hydrocarbylene group in which the heteroatom is a nitrogen atom and/or an oxygen atom. Examples of the heteroatom-containing hydrocarbylene group in which the heteroatom is a nitrogen atom and/or an oxygen atom include a heteroatom-containing hydrocarbylene group in which the heteroatom is a nitrogen atom, and a heteroatom-containing hydrocarbylene group in which the heteroatom is an oxygen atom. Examples of the hydrocarbylene group include an alkanediyl group, an alkenediyl group, and an arylene group. Examples of the alkanediyl group include polymethylene groups such as a trimethylene group, a tetramethylene group, a pentamethylene group, and a hexamethylene group; and a 2,2,4-trimethylhexane-1,6-diyl group. Examples of the alkenediyl group include a pent-2-ene-1,5-diyl group. Examples of the arylene group include a 1,4-phenylene group. Examples of the heteroatom-containing hydrocarbylene group in which the heteroatom is a nitrogen atom include a group represented by —CH=N—CH=CH—, and a group represented by —CH=N—CH$_2$—CH$_2$—. Examples of the heteroatom-containing hydrocarbylene group in which the heteroatom is an oxygen atom include a group represented by —(CH$_2$)$_s$—O—(CH$_2$)$_t$— (s and t represent an integer of 1 or more).

In the formula (3), examples of the divalent group in which $R^{31}$ and $R^{34}$ are bound, and the divalent group of $R^{33}$ include a hydrocarbylene group, a heteroatom-containing hydrocarbylene group in which the heteroatom is a nitrogen atom, a heteroatom-containing hydrocarbylene group in which the heteroatom is an oxygen atom, a group in which a hydrocarbylene group and an oxygen atom are bound, and a group in which a hydrocarbylene group and a group represented by —NR$^{35}$— (R$^{35}$ represents a hydrocarbyl group or a hydrogen atom) are bound. Examples of the hydrocarbylene group include an alkanediyl group, an alkenediyl group, and an arylene group. Examples of the alkanediyl group include polymethylene groups such as a trimethylene group, a tetramethylene group, a pentamethylene group, and a hexamethylene group; and a 2,2,4-trimethylhexane-1,6-diyl group. Examples of the alkenediyl group include a pent-2-ene-1,5-diyl group. Examples of the arylene group include a 1,4-phenylene group. Examples of the heteroatom-containing hydrocarbylene group in which the heteroatom is a nitrogen atom include a group represented by —CH=N—CH=CH—, and a group represented by —CH=N—CH$_2$—CH$_2$—. Examples of the heteroatom-containing hydrocarbylene group in which the heteroatom is an oxygen atom include a group represented by —(CH$_2$)$_s$—O—(CH$_2$)$_t$— (s and t represent an integer of 1 or more). Examples of the group in which a hydrocarbylene group and an oxygen atom are bound include a group represented by —(CH$_2$)$_r$—O— (r represents an integer of 1 or more). Examples of the group in which a hydrocarbylene group and a group represented by —NR$^{35}$— (R$^{35}$ represents a hydrocarbyl group or a hydrogen atom) are bound include a group represented by —(CH$_2$)$_q$—NR$^{35}$— (R$^{35}$ represents a hydrocarbyl group having 1 to 6 carbon atoms, or a hydrogen atom, and q represents an integer of 1 or more). Examples of the hydrocarbyl group of R$^{35}$ include alkyl groups such as a methyl group, an ethyl group, an n-propyl group, an isopropyl group, an n-butyl group, an isobutyl group, a sec-butyl group, a tert-butyl group; alkenyl groups such as a vinyl group, and an isopropenyl group; and aryl groups such as a phenyl group.

Examples of a preferable compound represented by the formula (3) include a compound represented by the formula (3-A) in which p is 0, and $R^{34}$ is a hydrocarbyl group optionally having a substituent, or a hydrogen atom:

(3-A)

wherein $R^{31}$ and $R^{32}$ may be bound, $R^{34}$ represents a hydrocarbyl group optionally having a substituent, or is bound with $R^{32}$ to represent a hydrocarbylene group optionally having a nitrogen atom and/or an oxygen atom as a heteroatom, $R^{32}$ represents a hydrocarbyl group optionally having a substituent, or is bound with $R^{31}$ to represent a hydrocarbylene group optionally having a nitrogen atom and/or an oxygen atom as a heteroatom, and $R^{34}$ represents a hydrocarbyl group optionally having a substituent or a hydrogen atom.

In the formula (3-A), explanation and exemplification of a hydrocarbyl group optionally having a substituent of $R^{31}$, $R^{32}$ and $R^{34}$, and a hydrocarbylene group optionally having a nitrogen atom and/or an oxygen atom as a heteroatom, in which $R^{31}$ and $R^{32}$ are bound, are the same as those stated in explanation of the formula (3).

In the formula (3-A), $R^{31}$ is preferably a hydrocarbyl group having 1 to 10 carbon atoms, or is bound with $R^{32}$ to be a hydrocarbylene group having 3 to 10 carbon atoms, or a heteroatom-containing hydrocarbylene group having 3 to 10 carbon atoms in which the heteroatom is a nitrogen atom. More preferable is an alkyl group having 1 to 10 carbon atoms or an aryl group having 6 to 10 carbon atoms, or is bound with $R^{32}$ to be a polymethylene group having 3 to 10 carbon atoms, a group represented by —CH=N—CH=CH— or a group represented by —CH=N—CH$_2$—CH$_2$—. Further preferable is an alkyl group having 1 to 6 carbon atoms. Particularly preferable is a methyl group or an ethyl group.

In the formula (3-A), $R^{32}$ is preferably a hydrocarbyl group having 1 to 10 carbon atoms, or is bound with $R^{34}$ to be a hydrocarbylene group having 3 to 10 carbon atoms or a heteroatom-containing hydrocarbylene group having 3 to 10 carbon atoms in which the heteroatom is a nitrogen atom. More preferable is an alkyl group having 1 to 10 carbon atoms or an aryl group having 6 to 10 carbon atoms, or $R^{32}$ is bound with $R^{31}$ to be a polymethylene group having 3 to 10 carbon atoms, a group represented by —CH=N—CH=CH— or a group represented by —CH=N—CH$_2$—CH$_2$—. Further preferable is an alkyl group having 1 to 6 carbon atoms. Particularly preferable is a methyl group or an ethyl group.

In the formula (3-A), $R^{34}$ is preferably a hydrocarbyl group or a hydrogen atom, more preferably a hydrocarbyl group having 1 to 10 carbon atoms or a hydrogen atom, further preferably an alkyl group having 1 to 6 carbon atoms, an alkenyl group having 2 to 6 carbon atoms or a hydrogen atom, particularly preferably a hydrogen atom, a methyl group, an ethyl group, a vinyl group, or an isopropenyl group.

Of the compounds represented by the formula (3-A), examples of a compound in which $R^{34}$ is a an alkyl group include N,N-dihydrocarbylacetamides such as N,N-dimethylacetamide, N,N-diethylacetamide, and N-methyl-N-ethylacetamide; and N,N-dihydrocarbylpropionamides such as N,N-dimethylpropionamide, N,N-diethylpropionamide, and N-methyl-N-ethylpropionamide.

Of the compounds represented by the formula (3-A), examples of a compound in which $R^{34}$ is a an alkenyl group include N,N-dihydrocarbylacrylamides such as N,N-dimethylacrylamide, N,N-diethylacrylamide, and N-methyl-N-ethylacrylamide; and N,N-dihydrocarbylmethacrylamides such as N,N-dimethylmethacrylamide, N,N-diethylmethacrylamide, and N-methyl-N-ethylmethacrylamide.

Of the compounds represented by the formula (3-A), examples of a compound in which $R^{34}$ is a hydrogen atom include N,N-dihydrocarbylformamides such as N,N-dimethylformamide, N,N-dimethylformamide, and N-methyl-N-ethylformamide.

Examples of a preferable compound represented by the formula (3) include a compound represented by the formula (3-B) in which p is 0, and $R^{34}$ and $R^{31}$ are bound to be a divalent group:

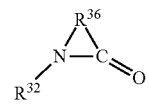

(3-B)

wherein $R^{32}$ represents a hydrocarbyl group optionally having a substituent, $R^{36}$ represents a hydrocarbylene group, or a group in which a hydrocarbylene group and a group represented by —NR$^{35}$— are bound, and $R^{35}$ represents a hydrocarbyl group or a hydrogen atom.

In the formula (3-B), explanation and exemplification of a hydrocarbyl group optionally having a substituent of $R^{32}$ are the same as those stated in explanation of the formula (3).

In the formula (3-B), the number of carbon atoms of a hydrocarbyl group of $R^{32}$ is preferably 1 to 10. When the hydrocarbyl group of $R^{32}$ is an alkyl group, the number of carbon atoms of $R^{32}$ is more preferably 1 to 10, further preferably 1 to 2. When the hydrocarbyl group of $R^{32}$ is an alkenyl group, the number of carbon atoms of $R^{32}$ is more preferably 2 to 6, further preferably 2. When the hydrocarbyl group of $R^{32}$ is an aryl group, the number of carbon atoms of $R^{32}$ is more preferably 6 to 8, further preferably 6.

In the formula (3-B), examples of the hydrocarbylene group of $R^{36}$ include an alkanediyl group, an alkenediyl group, and an arylene group. Examples of the alkanediyl group include polymethylene groups such as a trimethylene group, a tetramethylene group, a pentamethylene group, and a hexamethylene group; and a 2,2,6-trimethylhexane-1,6-diyl group. Examples of the alkenediyl group include a pent-2-ene-1,5-diyl group. Examples of the arylene group include a 1,4-phenylene group. Examples of the group in which a hydrocarbylene group and a group represented by —NR$^{35}$— ($R^{35}$ represents a hydrocarbyl group or a hydrogen atom) are bound of $R^{36}$ include a group represented by —(CH$_2$)$_q$—NR$^{35}$— ($R^{35}$ represents a hydrocarbyl group or a hydrogen atom, and q represents an integer of 1 or more).

In the formula (3-B), when $R^{36}$ is a group in which a hydrocarbylene group and a group represented by —NR$^{35}$— are bound, the hydrocarbyl group of $R^{36}$ is preferably a hydrocarbyl group having 1 to 10 carbon atoms, more preferably an alkyl group having 1 to 6 carbon atoms, an alkenyl group having 2 to 6 carbon atoms or a phenyl group, further preferably a methyl group, an ethyl group, a vinyl group, or an phenyl group.

In the formula (3-B), when $R^{36}$ is a hydrocarbylene group, the number of carbon atoms of $R^{36}$ is preferably 1 to 10, more preferably 3 to 6. When $R^{36}$ is a group in which a hydrocarbylene group and a group represented by —NR$^{35}$— are bound, the number of carbon atoms of the hydrocarbylene group is preferably 1 to 8, more preferably 2 to 5.

In the formula (3-B), $R^{32}$ is preferably a hydrocarbyl group having 1 to 10 carbon atoms, more preferably an alkyl group having 1 to 10 carbon atoms or an aryl group having 6 to 10 carbon atoms, further preferably an alkyl group having 1 to 6 carbon atoms or a phenyl group, particularly preferably a methyl group, an ethyl group, or a phenyl group.

In the formula (3-B), $R^{36}$ is preferably a hydrocarbylene group having 1 to 10 carbon atoms, or a group in which a hydrocarbylene group having 1 to 10 carbon atoms and a group represented by —NR$^{35}$— ($R^{35}$ represents a hydrocarbyl group having 1 to 10 carbon atoms or a hydrogen atom) are bound. When $R^{36}$ is a group in which a hydrocarbylene group having 1 to 10 carbon atoms and a group represented by —NR$^{35}$— are bound, it is preferable that the hydrocarbylene group of R$^{36}$ is bound with a nitrogen atom of the formula (3-B) and that a group represented by —NR$^{35}$— of R$^{36}$ is bound with a carbon atom of a carbonyl group of the formula (3-B). R$^{36}$ more preferably represents a polymethylene group having 3 to 6 carbon atoms, or a group represented by —(CH$_2$)$_q$—NR$^{35}$— (R$^{35}$ represents a hydrocarbyl group having 1 to 10 carbon atoms, q represents an integer of 2 to 5, —(CH$_2$)$_q$— is bound with a nitrogen atom of the formula (3-B), and —NR$^{35}$— is bound with a carbon atom of a carbonyl group of the formula (3-B)), further preferably a trimethylene group, a tetramethylene group, a pentamethylene group, or a group represented by —(CH$_2$)$_2$—N(CH$_3$)— (provided that —(CH$_2$)$_q$— is bound with a nitrogen atom of the formula (3-B), and that —NR$^{35}$— is bound with a carbon atom of a carbonyl group of the formula (3-B)).

Of the compounds represented by the formula (3-B), examples of a compound in which R$^{36}$ is a hydrocarbylene group include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone, and N-methyl-5-methyl-2-pyrrolidone; N-hydrocarbyl-2-piperidones such as N-methyl-2-piperidone, N-vinyl-2-piperidone, and N-phenyl-2-piperidone; N-hydrocarbyl-ε-caprolactams such as N-methyl-ε-caprolactam and N-phenyl-ε-caprolactam; N-hydrocarbyl-ω-laurylolactams such as N-methyl-ω-laurylolactam and N-vinyl-ω-laurylolactam and, among them, N-methyl-2-pyrrolidone, N-phenyl-2-pyrrolidone, N-methyl-ε-caprolactam, N-phenyl-ε-caprolactam are preferable, and N-phenyl-2-pyrrolidone and N-methyl-ε-caprolactam are more preferable.

Of the compounds represented by the formula (3-B), examples of a compound in which R$^{36}$ is a group in which a hydrocarbylene group and a group represented by —NR$^{35}$— (R$^{35}$ represents a hydrocarbyl group or a hydrogen atom) are bound include 1,3-dihydrocarbyl-2-imidazolidinones such as 1,3-dimethyl-2-imidazolidinone, 1,3-diethyl-2-imidazolidinone, 1,3-divinyl-2-imidazolidinone, and 1-methyl-3-ethyl-2-imidazolidinone and, among them, 1,3-dimethyl-2-imidazolidinone is preferable.

Examples of a preferable compound represented by the formula (3) include a compound represented by the following formula (3-C) in which p is 1, and R$^{33}$ is a hydrocarbylene group:

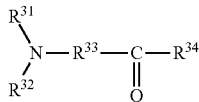
(3-C)

wherein R$^{31}$ and R$^{32}$ may be bound, R$^{31}$ represents a hydrocarbyl group optionally having a substituent, or is bound with R$^{32}$ to represent a hydrocarbylene group optionally having a nitrogen atom and/or an oxygen atom as a heteroatom, R$^{32}$ represents a hydrocarbyl group optionally having a substituent, or is bound with R$^{31}$ to represent a hydrocarbylene group optionally having a nitrogen atom and/or an oxygen atom as a heteroatom, R$^{33}$ represents a hydrocarbylene group, and R$^{34}$ represents a hydrocarbyl group optionally having a substituent.

In the formula (3-C), explanation and exemplification of a hydrocarbyl group optionally having a substituent of R$^{31}$, R$^{32}$ and R$^{34}$, a hydrocarbylene group optionally having a nitrogen atom and/or an oxygen atom as a heteroatom, in which R$^{31}$ and R$^{32}$ are bound, and a hydrocarbylene group of R$^{33}$ are the same as those stated in explanation of the formula (3).

In the formula (3-C), R$^{33}$ is preferably a hydrocarbylene group having 1 to 10 carbon atoms, more preferably an alkanediyl group having 1 to 10 carbon atoms or an arylene group having 1 to 10 carbon atoms, further preferably a methylene group, a polymethylene group having 2 to 6 carbon atoms, or a phenylene group, particularly preferably an ethylene group, a trimethylene group, or a 1,4-phenylene group.

In the formula (3-C), R$^{34}$ is preferably a hydrocarbyl group having 1 to 10 carbon atoms, or a substituted hydrocarbyl group having 1 to 10 carbon atoms in which the substituent is a dialkylamino group, more preferably an alkyl group having 1 to 6 carbon atoms, an aryl group having 6 to 10 carbon atoms, a dialkylaminoalkyl group having 3 to 6 carbon atoms, or a dialkylaminoaryl group having 8 to 15 carbon atoms, further preferably a methyl group, an ethyl group, a phenyl group, a 3-dimethylaminoethyl group, or a 4-diethylaminophenyl group.

In the formula (3-C), R$^{31}$ is preferably a hydrocarbyl group having 1 to 10 carbon atoms, or is bound with R$^{32}$ to be a hydrocarbylene group having 3 to 10 carbon atoms, or a heteroatom-containing hydrocarbylene group having 3 to 10 carbon atoms in which the heteroatom is a nitrogen atom, more preferably an alkyl group having 1 to 10 carbon atoms or an aryl group having 6 to 10 carbon atoms, or is bound with R$^{32}$ to be an alkanediyl group having 3 to 10 carbon atoms, a group represented by —CH=N—CH=CH—, a group represented by —CH=N—CH$_2$—CH$_2$—, or a group represented by —(CH$_2$)$_2$—O—(CH$_2$)$_2$—, further preferably an alkyl group having 1 to 6 carbon atoms, or is bound with R$^{32}$ to be a polymethylene group having 3 to 6 carbon atoms, a group represented by —CH=N—CH=CH—, or a group represented by —CH=N—CH$_2$—CH$_2$—, particularly preferably a methyl group or an ethyl group, or is bound with R$^{32}$ to be a tetramethylene group, a hexamethylene group, or a group represented by —CH=N—CH=CH—.

In the formula (3-C), R$^{32}$ is preferably a hydrocarbyl group having 1 to 10 carbon atoms, or is bound with R$^{31}$ to be a hydrocarbylene group having 3 to 10 carbon atoms, or a heteroatom-containing hydrocarbylene group having 3 to 10 carbon atoms in which the heteroatom is a nitrogen atom, more preferably an alkyl group having 1 to 10 carbon atoms or an aryl group having 1 to 10 carbon atoms, or is bound with R$^{31}$ to be an alkanediyl group having 3 to 10 carbon atoms, a group represented by —CH=N—CH=CH—, a group represented by —CH=N—CH$_2$—CH$_2$—, or a group represented by —(CH$_2$)$_2$—O—(CH$_2$)$_2$—, further preferably an alkyl group having 1 to 6 carbon atoms, or is bound with R$^{31}$ to be a polymethylene group having 3 to 6 carbon atoms, a group represented by —CH=N—CH=CH—, or —CH=N—CH$_2$—CH$_2$—, particularly preferably a methyl group or an ethyl group, or is bound with R$^{31}$ to be a tetramethylene group, a hexamethylene group, or a group represented by —CH=N—CH=CH—.

Of the compounds represented by the formula (3-C), examples of a compound in which R$^{34}$ is a hydrocarbyl group include 4-(N,N-dihydrocarbylamino)acetophenones such as 4-(N,N-dimethylamino)acetophenone, 4-(N-methyl-N-ethylamino)acetophenone, and 4-(N—N-diethylamino)acetophenone; and 4-cyclic aminoacetophenone compounds such as 4'-(imidazol-1-yl)acetophenone and 4-pyrazolylacetophenone and, among them, a 4-cyclic aminoacetophenone compound is preferable, and 4'-(imidazol-1-yl)acetophenone is more preferable.

Of the compounds represented by the formula (3-C), examples of a compound in which $R^{34}$ is a substituted hydrocarbyl group include bis(N,N-dihydrocarbylaminoalkyl)ketones such as 1,7-bis(N-methyl-N-ethylamino)-4-heptanone and 1,3-bis(N,N-diphenylamino)-2-propanone; 4-(N,N-dihydrocarbylamino)benzophenones such as 4-(N,N-dimethylamino)benzophenone, 4-(N,N-di-t-butylamino) benzophenone and 4-(N,N-diphenylamino)benzophenone; and 4,4'-bis(N,N-dihydrocarbylamino)benzophenones such as 4,4'-bis(N,N-dimethylamino)benzophenone, 4,4'-bis(N,N-diethylamino)benzophenone, and 4,4'-bis(N,N-diphenylamino)benzophenone and, among them, 4,4'-bis(N,N-dihydrocarbylamino)benzophenone is preferable, and 4,4'-bis(N,N-diethylamino)benzophenone is more preferable.

Examples of a preferable compound represented by the formula (3) include a compound represented by the following formula (3-D) in which p is 1, and $R^{33}$ is a group in which a hydrocarbylene group and an oxygen atom are bound, or a group in which a hydrocarbylene group and a group represented by $-NR^{35}-$ ($R^{35}$ represents a hydrocarbyl group or a hydrogen atom) are bound:

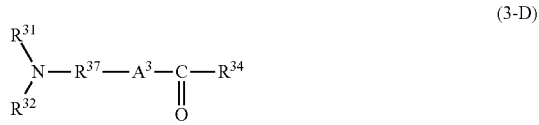

(3-D)

wherein $R^{31}$ and $R^{32}$ may be bound, $R^{31}$ represents a hydrocarbyl group optionally having a substituent, or is bound with $R^{32}$ to represent a hydrocarbylene group optionally having a nitrogen atom and/or an oxygen atom as a heteroatom, $R^{32}$ represents a hydrocarbyl group optionally having a substituent, or is bound with $R^{31}$ to represent a hydrocarbylene group optionally having a nitrogen atom and/or an oxygen atom as a heteroatom, $R^{37}$ represents a hydrocarbylene group, $A^3$ represents an oxygen atom or a group represented by $-NR^{35}-$, $R^{35}$ represents a hydrocarbyl group or a hydrogen atom, and $R^{34}$ represents a hydrocarbyl group optionally having a substituent.

In the formula (3-D), explanation and exemplification of a hydrocarbyl group optionally having a substituent of $R^{31}$, $R^{32}$ and $R^{34}$, and a hydrocarbylene group optionally having a nitrogen atom and/or an oxygen atom as a heteroatom in which $R^{31}$ and $R^{32}$ are bound are the same as those stated in explanation of the formula (3).

In the formula (3-D), $A^3$ is an oxygen atom or a group represented by $-NR^{35}-$ ($R^{35}$ is a hydrocarbyl group having 1 to 5 carbon atoms or a hydrogen atom). Examples of the hydrocarbyl group of $R^{35}$ include a methyl group and an ethyl group. $R^{35}$ is preferably an oxygen atom or a group represented by $-NH-$, more preferably a group represented by $-NH-$.

In the formula (3-D), examples of the hydrocarbylene group of $R^{37}$ include an alkanediyl group, an alkenediyl group, and an arylene group. Examples of the alkanediyl group include polymethylene groups such as a trimethylene group, a tetramethylene group, a pentamethylene group, and a hexamethylene group; and a 2,2,4-trimethylhexane-1,6-diyl group. Examples of the alkenediyl group include a pent-2-ene-1,5-diyl group. Examples of the arylene group include a 1,4-phenylene group. $R^{37}$ is preferably an alkanediyl group, more preferably a polymethylene group.

In the formula (3-D), the number of carbon atoms of a hydrocarbylene group of $R^{37}$ is preferably 1 to 8, more preferably 1 to 6, further preferably 2 to 4, particularly preferably 3.

In the formula (3-D), $R^{34}$ is preferably a hydrocarbyl group having 1 to 10 carbon atoms, more preferably an alkenyl group having 2 to 5 carbon atoms, further preferably a vinyl group or an isopropenyl group, particularly preferably a vinyl group.

In the formula (3-D), $R^{37}$ is preferably a hydrocarbylene group having 1 to 10 carbon atoms, more preferably a methylene group or a polymethylene group having 2 to 6 carbon atoms, further preferably an ethylene group, a trimethylene group or a tetramethylene group, particularly preferably a trimethylene group.

In the formula (3-D), $R^{31}$ is preferably a hydrocarbyl group having 1 to 10 carbon atoms, or is bound with $R^{32}$ to be a hydrocarbylene group having 3 to 10 carbon atoms, or a heteroatom-containing hydrocarbylene group having 3 to 10 carbon atoms in which the heteroatom is a nitrogen atom, more preferably an alkyl group having 1 to 10 carbon atoms or an aryl group having 6 to 10 carbon atoms, or is bound with $R^{32}$ to be an alkanediyl group having 3 to 10 carbon atoms, a group represented by $-CH=N-CH=CH-$, a group represented by $-CH=N-CH_2-CH_2-$, or a group represented by $-(CH_2)_2-O-(CH_2)_2-$, further preferably an alkyl group having 1 to 6 carbon atoms, or is bound with $R^{32}$ to be a polymethylene group having 3 to 6 carbon atoms, a group represented by $-CH=N-CH=CH-$, or a group represented by $-CH=N-CH_2-CH_2-$, particularly preferably a methyl group or an ethyl group, or is bound with $R^{32}$ to be a tetramethylene group, a hexamethylene group, or a group represented by $-CH=N-CH=CH-$.

In the formula (3-D), $R^{32}$ is preferably a hydrocarbyl group having 1 to 10 carbon atoms, or is bound with $R^{31}$ to be a hydrocarbylene group having 3 to 10 carbon atoms, or a heteroatom-containing hydrocarbylene group having 3 to 10 carbon atoms in which the heteroatom is a nitrogen atom, more preferably an alkyl group having 1 to 10 carbon atoms or an aryl group having 6 to 10 carbon atoms, or is bound with $R^{31}$ to be an alkanediyl group having 3 to 10 carbon atoms, a group represented by $-CH=N-CH=CH-$, a group represented by $-CH=N-CH_2-CH_2-$, or a group represented by $-(CH_2)_2-O-(CH_2)_2-$, further preferably an alkyl group having 1 to 6 carbon atoms, or is bound with $R^{31}$ to be a polymethylene group having 3 to 6 carbon atoms, a group represented by $-CH=N-CH=CH-$, or $-CH=N-CH_2-CH_2-$, particularly preferably a methyl group or an ethyl group, or is bound with $R^{31}$ to be a tetramethylene group, a hexamethylene group, or a group represented by $-CH=N-CH=CH-$.

Of the compounds represented by the formula (3-D), examples of a compound in which $A^3$ is an oxygen atom include 2-(dihydrocarbylamino)ethyl acrylates such as 2-(dimethylamino)ethyl acrylate and 2-(diethylamino)ethyl acrylate; 3-(dihydrocarbylamino)propyl acrylates such as 3-(dimethylamino)propyl acrylate; 2-(dihydrocarbylamino) ethyl methacrylates such as 2-(dimethylamino)ethyl methacrylate and 2-(diethylamino)ethyl methacrylate; and 3-(dihydrocarbylamino)propyl methacrylates such as 3-(dimethylamino)propyl methacrylate. The compound in which $A^3$ is an oxygen atom is preferably a compound in which $R^{31}$ and $R^{32}$ are alkyl groups having 1 to 6 carbon atoms, or $R^{31}$ and $R^{32}$ are bound to be a polymethylene group having 3 to 6 carbon atoms, $R^{37}$ is a methylene group or a polymethylene group having 2 to 6 carbon atoms, and $R^{34}$ is an alkenyl group having 2 to 5 carbon atoms, more preferably a compound in which $R^{31}$ and $R^{32}$ are alkyl groups having 1 to 6 carbon atoms, $R^{37}$ is an ethylene group or a trimethylene group, and $R^{34}$ is a vinyl group or an isopropenyl group, further preferably a compound in which $R^{31}$ and $R^{32}$ are methyl groups or ethyl groups, $R^{37}$ is a trimethylene group, and $R^{34}$ is a vinyl group.

Of the compounds represented by the formula (3-D), examples of a compound in which $A^3$ is a group represented by —$NR^{35}$— ($R^{35}$ is a hydrocarbyl group or a hydrogen atom) include N-[2-(dihydrocarbylamino)ethyl]acrylamides such as N-[2-(dimethylamino)ethyl]acrylamide and N-[2-(diethylamino)ethyl]acrylamide; N-[3-(dihydrocarbylamino)propyl]acrylamides such as N-[3-(dimethylamino)propyl]acrylamide and N-[3-(diethylamino)propyl]acrylamide; N-[4-(dihydrocarbylamino)butyl]acrylamides such as N-[4-(dimethylamino)butyl]acrylamide and N-[4-(diethylamino)butyl]acrylamide; N-[2-(dihydrocarbylamino)ethyl]meth]acrylamides such as N-[2-(dimethylamino))ethyl]meth]acrylamide and N-[2-(diethylamino)ethyl]meth]acrylamide; N-[3-(dihydrocarbylamino)propylmeth]acrylamides such as N-[3-(dimethylamino)propylmeth]acrylamide and N-[3-(diethylamino)propylmeth]acrylamide; and N-[4-(dihydrocarbylamino)butylmeth]acrylamides such as N-[4-(dimethylamino)butylmeth]acrylamide and N-[4-(diethylamino)butylmeth]acrylamide. Among them, preferable is a compound in which $A^3$ is a group represented by —NH—, $R^{31}$ and $R^{32}$ are alkyl groups having 1 to 6 carbon atoms, or $R^{31}$ and $R^{32}$ are bound to be a polymethylene group having 3 to 6 carbon atoms, $R^{37}$ is a methylene group or a polymethylene group having 2 to 6 carbon atoms, and $R^{34}$ is an alkenyl group having 2 to 5 carbon atoms, more preferable is a compound in which $A^3$ is a group represented by —NH—, $R^{31}$ and $R^{32}$ are alkyl groups having 1 to 6 carbon atoms, $R^{37}$ is an ethylene group or a trimethylene group, and $R^{34}$ is a vinyl group or an isopropenyl group, further preferable is a compound in which $A^3$ is a group represented by —NH—, $R^{31}$ and $R^{32}$ are a methyl group or an ethyl group, $R^{37}$ is a trimethylene group, and $R^{34}$ is a vinyl group.

The compound represented by the formula (3) is preferably a compound represented by the formula (3-D), more preferably a compound in which, in the formula (3-D), $A^3$ is an oxygen atom or a group represented by —NH—, $R^{31}$ and $R^{32}$ are alkyl groups having 1 to 6 carbon atoms, or $R^{31}$ and $R^{32}$ are bound to be a polymethylene group having 3 to 6 carbon atoms, $R^{37}$ is a methylene group or a polymethylene group having 2 to 6 carbon atoms, and $R^{34}$ is an alkenyl group having 2 to 5 carbon atoms, further preferably a compound in which $A^3$ is a group represented by —NH—, $R^{31}$ and $R^{32}$ are alkyl groups having 1 to 6 carbon atoms, $R^{37}$ is an ethylene group or a trimethylene group, and $R^{34}$ is a vinyl group or an isopropenyl group, particularly preferably a compound in which $A^3$ is a group represented by —NH—, $R^{31}$ and $R^{32}$ are a methyl group or an ethyl group, $R^{37}$ is a trimethylene group, and $R^{34}$ is a vinyl group.

In the process (b), the addition amount of the modifying agent having a nitrogen atom-containing group is usually 0.1 mol to 3 mol, preferably 0.5 mol to 2 mol, more preferably 0.7 mol to 1.5 mol per 1 mol of the organometallic compound used in polymerization.

In the process (b), the temperature at which the conjugated diene-based polymer and the modifying agent having a nitrogen atom-containing group are reacted is usually 25° C. to 100° C., preferably 35° C. to 90° C., more preferably 50° C. to 80° C. The reaction time is usually 60 seconds to 5 hours, preferably 5 minutes to 1 hour.

In polymerization of the monomer components, respective monomer components may be supplied in a plurality of times or all of them may be supplied at once. In addition, respective monomers may be supplied to a polymerization reactor at different times, or at the same time.

153 In polymerization of the monomer components, in which the organometallic compound is used for polymerizing monomer components to obtain the conjugated diene-based polymer, 10% by weight or more and 40% by weight or less of the compound represented by the formula (1) may be supplied in a hydrocarbon solvent before the degree of progress of polymerization exceed 15%, 40% by weight or more and 70% by weight or less of the compound represented by the formula (1) may be supplied in a hydrocarbon solvent before the degree of progress of polymerization exceed 30%, and 70% by weight or more and 100% by weight or less of the compound represented by the formula (1) may be supplied in a hydrocarbon solvent before the degree of progress of polymerization exceed 90%. A conjugated diene-based polymer composition is obtained which is excellent in gripping properties and fully satisfactory in tensile strength at break, by using the conjugated diene-based polymer obtained according to the method mentioned above. In the present specification, a degree of progress of polymerization is defined to be a rate of a weight average molecular weight of the conjugated diene-based polymer at a certain point to a weight average molecular weight of the conjugated diene-based polymer finally obtained.

In polymerization of the monomer components, the polymerization temperature is usually 25° C. or higher, preferably 35° C. or higher, further preferably 50° C. or higher. In addition, the polymerization temperature is usually 100° C. or lower, preferably 90° C. or lower, further preferably 80° C. or lower. The polymerization time is usually 10 minutes or longer and 5 hours or shorter.

The conjugated diene-based polymer may be a polymer which has been coupled with a coupling agent. The coupled polymer is usually obtained by adding a coupling agent to a polymer solution obtained by polymerizing a monomer component containing a conjugated diene compound and a compound represented by the formula (1) to react them. When a conjugated diene-based polymer having a nitrogen atom-containing group on at least one of polymer chain ends is produced by the process (b), addition of the coupling agent is usually performed before addition of the modifying agent having a nitrogen atom-containing group to a polymerization solution. Examples of the coupling agent include a compound represented by the following formula (4):

$$R^{41}{}_aML_{4-a} \qquad (4)$$

wherein $R^{41}$ represents an alkyl group, an alkenyl group, a cycloalkenyl group or an aryl group, M represents a silicon atom or a tin atom, L represents a halogen atom or a hydrocarbyloxy group, and a represents an integer of 0 to 2.

Examples of the coupling agent represented by the formula (4) include silicon tetrachloride, methyltrichlorosilane, dimethyldichlorosilane, tin tetrachloride, methyltrichlorotin, dimethyldichlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

The addition amount of the coupling agent is preferably 0.03 mol or more, more preferably 0.05 mol or more per 1 mol of the organometallic compound used in polymerization. The addition amount is preferably 0.4 mol or less, more preferably 0.3 mol or less.

In the conjugated diene-based polymer, an active end of a polymer chain may be inactivated with an alcohol or the like. Examples of an inactivating method include a method of adding an alcohol to a polymerization solution obtained by polymerizing a monomer component containing the conjugated diene-based compound and the compound represented by the formula (1). As the alcohol, methanol and 1-butanol can be used.

A conjugated diene-based polymer obtained by polymerization in a hydrocarbon solvent may be a polymer recovered from a polymerization solution. When the conjugated diene-based polymer is recovered from the polymerization solution, the conjugated diene-based polymer can be recovered from the polymerization solution by a known method such as a method of adding a coagulating agent to the polymerization solution or a method of adding steam to the polymerization solution. The recovered conjugated diene-based polymer may be dried with a known drier such as a band drier or an extrusion-type drier.

The conjugated diene-based polymer obtained by polymerization in a hydrocarbon solvent may be subjected to a step of a reaction with an organometallic compound described later, in the state of the polymerization solution.

<Reaction Between Conjugated Diene-Based Polymer and Organometallic Compound>

The modified conjugated diene-based polymer of the present invention is obtained by reacting a conjugated diene-based polymer with an organometallic compound, and reacting the resulting reaction product with a hydrocarbyloxysilane compound.

The reaction between the conjugated diene-based polymer and the organometallic compound is performed preferably in a hydrocarbon solvent. As the hydrocarbon solvent, the above-mentioned hydrocarbon solvents exemplified as the hydrocarbon solvent used in polymerization can be used.

The conjugated diene-based polymer is dissolved in the hydrocarbon solvent, and the organometallic compound is added to the resulting solution, thereby, the conjugated diene-based polymer and the organometallic compound can be reacted with each other. When the conjugated diene-based polymer obtained by polymerization in the hydrocarbon solvent is used in the state of the polymerization solution, the organometallic compound may be added to the polymerization solution to react the conjugated diene-based polymer with the organometallic compound.

Examples of the organometallic compound to be reacted with the conjugated diene-based polymer include organoalkali metal compounds such as an organolithium compound, an organosodium compound, and an organopotassium compound. Examples of the organolithium compound include a hydrocarbyllithium compound. Examples of the organosodium compound include sodium naphthalenide and sodium biphenylide. Examples of the organopotassium compound include potassium naphthalenide.

Examples of the hydrocarbyllithium compound include alkyllithium compounds such as ethyllithium, propyllithium, isopropyllithium, n-butyllithium, isobutyllithium, sec-butyllithium, tert-butyllithium, tert-octyllithium, and n-decyllithium; aryllithium compounds such as phenyllithium, 2-naphthyllithium, and 2-butylphenyllithium; arylalkyllithium compounds such as 4-phenylbutyllithium; and cycloalkyllithium compounds such as cyclopentyllithium and cyclohexyllithium. The hydrocarbyllithium compound is preferably an alkyllithium compound, more preferably n-butyllithium or sec-butyllihium, further preferably sec-butyllithium.

The organometallic compound to be reacted with the conjugated diene-based polymer may be the same as, or different from the organometallic compound used in polymerization.

In a step of reacting the conjugated diene-based polymer with the organometallic compound, the addition amount of the organometallic compound is preferably 20 mmol or less, more preferably 8 mmol or less, and preferably 0.5 mmol or more, per 100 g of the conjugated diene-based polymer.

When the conjugated diene-based polymer is a conjugated diene-based polymer which is obtained by using a hydrocarbyllithium compound as the organolithium compound, the addition amount of the organometallic compound is preferably 1 mmol or more, more preferably 2 mmol or more, and preferably 8 mmol or less, more preferably 4 mmol or less, per 100 g of the conjugated diene-based polymer.

When the conjugated diene-based polymer is a conjugated diene-based polymer which is obtained by using an organoalkali metal compound having a nitrogen atom-containing group, and in which an alcohol is added to a polymer solution containing a conjugated diene-based polymer obtained by polymerization to inactivate an active end of the polymer chains, the addition amount of the organometallic compound is preferably 1 mmol or more, more preferably 2 mmol or more, and preferably 8 mmol or less, more preferably 4 mmol or less, per 100 g of the conjugated diene-based polymer.

When the conjugated diene-based polymer is a conjugated diene-based polymer which is obtained by using an organoalkali metal compound having a group containing a nitrogen atom, and in which a modifying agent having a nitrogen atom-containing group is added to a polymerization solution containing a conjugated diene-based polymer obtained by polymerization to react the modifying agent with an active end of the polymer chains, the addition amount of the organometallic compound is preferably 0.5 mmol or more, more preferably 1 mmol or more, and preferably 3 mmol or less, more preferably 2.5 mmol or less, per 100 g of the conjugated diene-based polymer, so as to enhance the fuel cost saving effect and tensile elongation at break.

The reaction between the conjugated diene-based polymer and the organometallic compound is performed preferably in the presence of one or more kinds of compounds (hereinafter, sometimes referred to as a compound (X)) selected from the compound group consisting of an ether compound, a tertiary amine, a phosphine compound, an alkali metal alkoxide, and an alkali metal phenoxide, more preferably in the presence of a tertiary amine. Examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, and ethylene glycol dibutyl ether; aliphatic triethers such as diethylene glycol diethyl ether and diethylene glycol dibutyl ether; and aromatic ethers such as diphenyl ether and anisole. The ether compound is preferably a cyclic ether or an aliphatic diether, more preferably tetrahydrofuran or ethylene glycol diethyl ether. Examples of the tertiary amine include triethylamine, tripropylamine, tributylamine, 1,1,2,2-tetramethylethylenediamine, N,N-diethylaniline, N,N,N',N",N"-pentamethyldiethylenetriamine, 1,1,4,7,10,10-hexamethyltriethylenetetramine, (−)-sparteine, pyridine, and quinoline. The tertiary amine is preferably 1,1,2,2-tetramethylethylenediamine. Examples of the phosphine compound include trimethylphosphine, triethylphosphine, and triphenylphosphine. Examples of the alkali metal alkoxide include sodium-tert-butoxide, potassium-tert-butoxide, sodium-tert-pentoxide, and potassium-tert-pentoxide. Examples of the alkali metal phenoxide include sodium phenoxide and potassium phenoxide. The addition amount of the compound (X) is preferably 0.1 mol or more and 10 mol or less per 1 mol of the organometallic compound.

The compound (X) may be added to a conjugated diene-based polymer solution after it is mixed with the organometallic compound in advance, or the compound (X) and the organometallic compound may be successively added to the conjugated diene-based polymer solution.

The temperature at which the conjugated diene-based polymer is reacted with the organometallic compound is preferably 40° C. or higher, more preferably 50° C. or higher. The temperature is preferably 90° C. or lower, more preferably 80° C. or lower.

The time during which the conjugated diene-based polymer is reacted with the organometallic compound is preferably 10 seconds or longer, more preferably 1 minute or longer. The time is preferably 150 minutes or shorter, more preferably 50 minutes or shorter.

<Reaction with Hydrocarbyloxysilane Compound>

After the conjugated diene-based polymer is reacted with the organometallic compound, the resulting reaction product is reacted with a hydrocarbyloxysilane compound.

The reaction between the reaction product and the hydrocarbyloxysilane compound is performed preferably in a hydrocarbon solvent. As the hydrocarbon solvent, the above-mentioned hydrocarbon solvents exemplified as the hydrocarbon solvent used in polymerization can be used.

In the reaction between the reaction product and the hydrocarbyloxysilane compound, preferably, the hydrocarbyloxysilane compound is added to a solution containing the reaction product of the conjugated diene-based polymer and the organometallic compound, to react the reaction product of the conjugated diene-based polymer and the organometallic compound with the hydrocarbyloxysilane compound.

Preferable examples of the hydrocarbyloxysilane compound include a hydrocarbyloxysilane compound having a nitrogen atom-containing group. Examples of the nitrogen atom-containing group include an amino group, a substituted amino group, a nitrogen-containing heterocyclic group, a cyano group, an isocyanato group, and a group represented by the formula (5-B) described later. Examples of the substituted amino group include a group represented by the formula (5-A) described later. Examples of the nitrogen-containing heterocyclic group include a 4-pyridyl group and a 2-imidazolyl group.

Preferable examples of the hydrocarbyloxysilane compound having a nitrogen atom-containing group include a compound represented by the following formula (5):

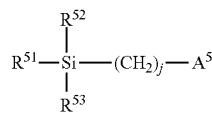

(5)

wherein $R^{51}$, $R^{52}$ and $R^{53}$ each represent a hydrocarbyl group or a hydrocarbyloxy group, at least one of $R^{51}$, $R^{52}$ and $R^{53}$ is a hydrocarbyloxy group, $A^5$ represents a nitrogen atom-containing group, and j represents an integer of 1 to 5.

In the formula (5), $R^{51}$, $R^{52}$ and $R^{53}$ each represent a hydrocarbyl group or a hydrocarbyloxy group, and at least one of $R^{51}$, $R^{52}$ and $R^{53}$ is a hydrocarbyloxy group. Preferably, at least two of $R^{51}$, $R^{52}$ and $R^{53}$ are hydrocarbyloxy groups, and more preferably, $R^{51}$, $R^{52}$ and $R^{53}$ are hydrocarbyloxy groups.

The number of carbon atoms of a hydrocarbyl group and a hydrocarbyloxy group of $R^{51}$, $R^{52}$ and $R^{53}$ is preferably 1 to 8, more preferably 1 to 6, further preferably 1 to 4.

Examples of the hydrocarbyl group of $R^{51}$, $R^{52}$ and $R^{53}$ include alkyl groups such as a methyl group, an ethyl group, an n-propyl group, an isopropyl group, an n-butyl group, an isobutyl group, a sec-butyl group, a tert-butyl group, an n-pentyl group, an n-hexyl group, and an n-octyl group; alkenyl groups such as a vinyl group, a 2-propenyl group, and an isopropenyl group; and aryl groups such as a phenyl group and a tolyl group, preferably an alkyl group, more preferably a linear alkyl group. Particularly preferable is a methyl group or an ethyl group.

Examples of the hydrocarbyloxy group of $R^{51}$, $R^{52}$ and $R^{53}$ include alkoxy groups such as a methoxy group, an ethoxy group, an n-propoxy group, and an n-butoxy group; and aryloxy groups such as a phenoxy group, preferably an alkoxy group. Particularly preferable is a methoxy group or an ethoxy group.

Preferably, $R^{51}$, $R^{52}$ and $R^{53}$ are hydrocarbyloxy groups having 1 to 8 carbon atoms or a hydrocarbyl group having 1 to 8 carbon atoms, and at least one of $R^{51}$, $R^{52}$ and $R^{53}$ is a hydrocarbyloxy group having 1 to 8 carbon atoms. More preferably, $R^{51}$, $R^{52}$ and $R^{53}$ are alkoxy groups having 1 to 6 carbon atoms or an alkyl group having 1 to 6 carbon atoms, and at least two of $R^{51}$, $R^{52}$ and $R^{53}$ are alkoxy groups having 1 to 6 carbon atoms. Further preferably, $R^{51}$, $R^{52}$ and $R^{53}$ are alkoxy groups having 1 to 4 carbon atoms. Particularly preferably, $R^{51}$, $R^{52}$ and $R^{53}$ are methoxy groups or ethoxy groups.

In the formula (5), j represents an integer of 1 to 5, preferably 2 or 3.

In the formula (5), $A^5$ represents a nitrogen atom-containing group. Examples of the nitrogen atom-containing group include an amino group, a substituted amino group, a nitrogen-containing heterocyclic group, a cyano group, an isocyanato group, and a group represented by the formula (5-B) described later.

The substituted amino group of $A^5$ is preferably a group represented by the following formula (5-A);

(5-A)

wherein $R^{54}$ and $R^{55}$ may be bound, $R^{54}$ represents a hydrocarbyl group optionally having a substituent, or a trihydrocarbylsilyl group, or is bound with $R^{55}$ to represent a hydrocarbylene group optionally having a nitrogen atom and/or an oxygen atom as a heteroatom, and $R^{55}$ represents a hydrocarbyl group optionally having a substituent, or a trihydrocarbylsilyl group, or is bound with $R^{54}$ to represent a hydrocarbylene group optionally having a nitrogen atom and/or an oxygen atom as a heteroatom.

Examples of the hydrocarbyl group optionally having a substituent of $R^{54}$ and $R^{55}$ include a hydrocarbyl group, a nitrogen atom-containing substituted hydrocarbyl group, and an oxygen atom-containing substituted hydrocarbyl group.

Examples of the hydrocarbyl group include alkyl groups such as a methyl group, an ethyl group, an n-propyl group, an isopropyl group, an n-butyl group, an isobutyl group, a sec-butyl group, a tert-butyl group, an n-pentyl group, an n-hexyl group, and an n-octyl group; alkenyl groups such as a vinyl group, a 2-propenyl group, and an isopropenyl group; and aryl groups such as a phenyl group and a tolyl group.

Examples of the nitrogen atom-containing substituted hydrocarbyl group include dialkylaminoalkyl groups such as a bis(dimethylaminomethyl)amino group, a bis(diethylaminomethyl)amino group, a bis(dimethylaminoethyl)amino group, and a bis(diethylaminoethyl)amino group.

Examples of the oxygen atom-containing substituted hydrocarbyl group include hydrocarbyloxyalkyl groups such as a methoxymethyl group, an ethoxymethyl group, a methoxyethyl group, and an ethoxyethyl group; monooxacycloalkyl groups such as a 2-tetrahydrofuranyl group; dioxacycloalkyl groups such as a 2-dioxolanyl group; and alkyl groups substituted with a monooxacycloalkyl group such as a tetrahydrofurfuryl group.

In the present specification, the monooxacycloalkyl group represents a group in which one $CH_2$ of a cycloalkyl group is substituted with an oxygen atom. The dioxacycloalkyl group represents a group in which two $CH_2$s of a cycloalkyl group are each substituted with an oxygen atom.

The hydrocarbyl group optionally having a substituent of $R^{54}$ and $R^{55}$ is preferably a hydrocarbyl group, more preferably an alkyl group, further preferably a linear alkyl group.

The number of carbon atoms of the hydrocarbyl group optionally having a substituent of $R^{54}$ and $R^{55}$ is preferably 1 to 8, more preferably 1 to 5, further preferably 1 to 3.

Examples of the trihydrocarbylsilyl group of $R^{54}$ and $R^{55}$ include trialkylsilyl groups such as a trimethylsilyl group, a triethylsilyl group, and a dimethyl-tert-butylsilyl group.

When $R^{54}$ and $R^{55}$ are trihydrocarbylsilyl groups, $R^{54}$ and $R^{55}$ are preferably trihydrocarbylsilyl groups having 3 to 7 carbon atoms, more preferably trialkylsilyl groups having 3 to 7 carbon atoms, in which the number of carbon atoms of each alkyl group bound to a silicon atom is 1 to 4, further preferably trimethylsilyl groups.

Examples of the hydrocarbylene group optionally having a nitrogen atom and/or an oxygen atom as a heteroatom, in which $R^{54}$ and $R^{55}$ are bound, include a hydrocarbylene group, a heteroatom-containing hydrocarbylene group in which the heteroatom is a nitrogen atom, and a heteroatom-containing hydrocarbylene group in which the heteroatom is an oxygen atom. Examples of the hydrocarbylene group include an alkanediyl group and an alkenediyl group. Examples of the alkanediyl group include polymethylene groups such as an ethylene group, a trimethylene group, a tetramethylene group, a pentamethylene group, and a hexamethylene group; and a 2,2,4-trimethylhexane-1,6-diyl group. Examples of the alkenediyl group include a pent-2-ene-1,5-diyl group. Examples of the heteroatom-containing hydrocarbylene group in which the heteroatom is a nitrogen atom include a group represented by —CH=N—CH=CH— and a group represented by —CH=N—CH$_2$—CH$_2$—. Examples of the heteroatom-containing hydrocarbylene group in which the heteroatom is an oxygen atom include a group represented by —CH$_2$—CH$_2$—O—CH$_2$—CH$_2$—.

The hydrocarbylene group optionally having a nitrogen atom and/or an oxygen atom as a heteroatom is preferably a hydrocarbylene group, more preferably an alkanediyl group, further preferably a polymethylene group.

The number of carbon atoms of the hydrocarbylene group optionally having a nitrogen atom and/or an oxygen atom as a heteroatom is preferably 2 to 10, more preferably 3 to 8, further preferably 4 to 6.

$R^{54}$ and $R^{55}$ each are preferably a hydrocarbyl group having 1 to 8 carbon atoms, or a trialkylsilyl group having 3 to 7 carbon atoms, or $R^{54}$ and $R^{55}$ are bound to be a hydrocarbylene group having 2 to 10 carbon atoms, more preferably an alkyl group having 1 to 5 carbon atoms, or a trialkylsilyl group having 3 to 7 carbon atoms in which the number of carbon atoms of each alkyl group bound to a silicon atom is 1 to 4, or $R^{54}$ and $R^{55}$ are bound to be an alkanediyl group having 3 to 8 carbon atoms, further preferably a linear alkyl group having 1 to 3 carbon atoms, or a trimethylsilyl group, or $R^{54}$ and $R^{55}$ are bound to be a polymethylene group having 4 to 6 carbon atoms.

$R^{54}$ represents a hydrocarbyl group optionally having a substituent, or a trihydrocarbylsilyl group, or is bound with $R^5$ to represent a hydrocarbylene group optionally having a nitrogen atom and/or an oxygen atom as a heteroatom. In addition, $R^{55}$ represents a hydrocarbyl group optionally having a substituent, or a trihydrocarbylsilyl group, or is bound with $R^{54}$ to represent a hydrocarbylene group optionally having a nitrogen atom and/or an oxygen atom as a heteroatom.

Of the substituted amino group represented by the formula (5-A), examples of a substituted amino group in which $R^{54}$ and $R^{55}$ are hydrocarbyl groups include a dimethylamino group, a diethylamino group, a di-n-propylamino group, a diisopropylamino group, a di-n-butylamino group, and an ethylmethylamino group.

Of the substituted amino group represented by the formula (5-A), examples of a substituted amino group in which $R^{54}$ and $R^{55}$ are substituted hydrocarbyl groups containing an oxygen atom include a bis(methoxymethyl)amino group, a bis(ethoxymethyl)amino group, a bis(methoxyethyl)amino group, a bis(ethoxyethyl)amino group, a bis(3-tetrahydrofuranyl)amino group, and a bis(tetrahydrofurfuryl)amino group.

Of the substituted amino group represented by the formula (5-A), examples of a substituted amino group in which $R^{54}$ and $R^{55}$ are trihydrocarbylsilyl groups include a bis(trimethylsilyl)amino group, a bis(triethylsilyl)amino group, and a bis(tert-butyldimethylsilyl)amino group.

Of the substituted amino group represented by the formula (5-A), examples of a substituted amino group in which one of $R^{54}$ and $R^{55}$ is a hydrocarbyl group, and the other is a trihydrocarbylsilyl group include a trimethylsilylmethylamino group and a trimethylsilylethylamino group.

Of the substituted amino group represented by the formula (5-A), examples of a substituted amino group in which $R^{54}$ and $R^{55}$ are bound to be a hydrocarbylene group include a pyrrolidino group, a piperidino group, a hexamethyleneimino group, and a 1,2,3,6-tetrahydropyridyl group.

Of the substituted amino group represented by the formula (5-A), examples of a substituted amino group in which $R^{54}$ and $R^{55}$ are bound to be a heteroatom-containing hydrocarbylene group having a nitrogen atom as a heteroatom include a 1-imidazolyl group, a 4,5-dihydro-1-imidazolyl group, a 1-pyrazyl group, and a 1-piperazinyl group.

Of the substituted amino group represented by the formula (5-A), examples of a substituted amino group in which $R^{54}$ and $R^{55}$ are bound to be a heteroatom-containing hydrocarbylene group having an oxygen atom as a heteroatom include a morpholino group.

Examples of the nitrogen-containing heterocyclic group include a 4-pyridyl group and a 2-imidazolyl group.

The nitrogen atom-containing group may be a group represented by the following formula (5-B):

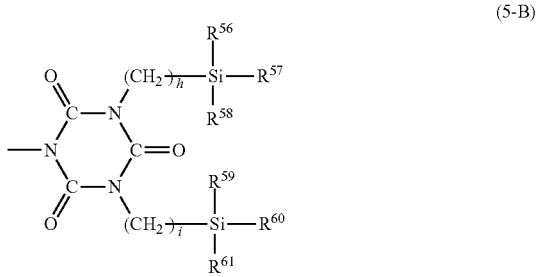

(5-B)

wherein $R^{56}$, $R^{57}$, $R^{58}$, $R^{59}$, $R^{69}$ and $R^{61}$ each represent a hydrocarbyl group or a hydrocarbyloxy group, at least one of $R^{56}$, $R^{57}$ and $R^{58}$ is a hydrocarbyloxy group, at least one of $R^{59}$, $R^{60}$, $R^{61}$ a hydrocarbyloxy group, h and i each represent an integer of 1 to 5.

In the formula (5-B), $R^{56}$, $R^{57}$ and $R^{58}$ each represent a hydrocarbyl group or a hydrocarbyloxy group, at least one of $R^{56}$, $R^{57}$ and $R^{58}$ is a hydrocarbyloxy group. Preferably, at least two of $R^{56}$, $R^{57}$ and $R^{58}$ are hydrocarbyloxy groups, more preferably $R^{56}$, $R^{57}$ and $R^{58}$ are hydrocarbyloxy groups.

In the formula (5-B), $R^{59}$, $R^{60}$ and $R^{61}$ each represent a hydrocarbyl group or a hydrocarbyloxy group, at least one of $R^{59}$, Ro and $R^{61}$ is a hydrocarbyloxy group. Preferably, at least two of $R^{59}$, $R^{60}$ and $R^{61}$ are hydrocarbyloxy groups, at least two of $R^{59}$, $R^{60}$ and $R^{61}$ hydrocarbyloxy groups.

The number of carbon atoms of the hydrocarbyl group and the hydrocarbyloxy group of $R^{56}$, $R^{57}$, $R^{58}$, $R^{59}$, $R^{60}$ and $R^{61}$ is preferably 1 to 8, more preferably 1 to 6, further preferably 1 to 4.

Examples of the hydrocarbyl group of $R^{56}$, $R^{57}$, $R^{58}$, $R^{59}$, $R^{60}$ and $R^{61}$ include alkyl groups such as a methyl group, an ethyl group, an n-propyl group, an isopropyl group, an n-butyl group, an isobutyl group, a sec-butyl group, a tert-butyl group, an n-pentyl group, an n-hexyl group, and an n-octyl group; alkenyl groups such as a vinyl group, a 2-propenyl group, and an isopropenyl group; and aryl groups such as a phenyl group and a tolyl group, preferably an alkyl group, more preferably a linear alkyl group. Particularly preferable is a methyl group or an ethyl group.

Examples of the hydrocarbyloxy group of $R^{56}$, $R^{57}$, $R^{58}$, $R^{59}$, $R^{60}$, and $R^{61}$ include alkoxy groups such as a methoxy group, an ethoxy group, an n-propoxy group, and an n-butoxy group; and aryloxy groups such as a phenoxy group, preferably an alkoxy group. Particularly preferable is a methoxy group or an ethoxy group.

Preferably, $R^{56}$, $R^{57}$, $R^{58}$, $R^{59}$, $R^{60}$ and $R^{61}$ each are a hydrocarbyloxy group having 1-8 carbons or a hydrocarbyl group having 1.8 carbons, at least one of $R^{56}$, $R^{57}$ and $R^{58}$ is a hydrocarbyloxy group having 1-8 carbons, and at least one of $R^{59}$, $R^{60}$ and $R^{61}$ is a hydrocarbyloxy group having 1-8 carbons. More preferably, $R^{56}$, $R^{57}$, $R^{58}$, $R^{59}$, $R^{60}$ and $R^{61}$ each are an alkoxy group having 1-6 carbons or an alkyl group having 1-6 carbons, at least two of $R^{56}$, $R^{57}$ and $R^{58}$ is a hydrocarbyloxy group having 1-8 carbons, and at least two of $R^{59}$, $R^{60}$ and $R^{61}$ are hydrocarbyloxy groups having 1-8 carbons. Further preferably, $R^{56}$, $R^{57}$, $R^{58}$, $R^{59}$, $R^{60}$, and $R^{61}$ each are an alkoxy group having 1-4 carbons. Particularly preferably, $R^{56}$, $R^{57}$, $R^{58}$, $R^{59}$, $R^{60}$ and $R^{61}$ each are a methoxy group or an ethoxy group.

In the formula (5-B), h and i each represent an integer of 1 to 5, preferably 2 or 3.

Preferable examples of the hydrocarbyloxysilane compound in the present invention include a compound represented by the following formula (5-1), which is represented by the formula (5), and in which $A^5$ is a group represented by the formula (5-A):

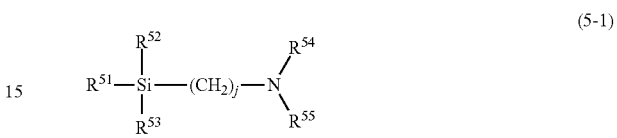

(5-1)

wherein $R^{54}$ and $R^{55}$ may be bound, $R^{51}$, $R^{52}$ and $R^{53}$ each represent a hydrocarbyl group or a hydrocarbyloxy group, at least one of $R^{51}$, $R^{52}$ and $R^{53}$ is a hydrocarbyloxy group, $R^{54}$ represents a hydrocarbyl group optionally having a substituent, or a trihydrocarbylsilyl group, or is bound with $R^{55}$ to represent a hydrocarbylene group optionally having a nitrogen atom and/or an oxygen atom as a heteroatom, and $R^{55}$ represents a hydrocarbyl group optionally having a substituent, or a trihydrocarbylsilyl group, or is bound with $R^{54}$ to represent a hydrocarbylene group optionally having a nitrogen atom and/or an oxygen atom as a heteroatom, and j represents an integer of 1 to 5.

Of the compounds represented by the formula (5-1), examples of a compound in which $R^{54}$ and $R^{55}$ are hydrocarbyl groups, and $R^{51}$, $R^{52}$ and $R^{53}$ are hydrocarbyloxy groups include [(dialkylamino)alkyl]trihydrocarbyloxysilane compounds such as [2-(dimethylamino)ethyl]trimethoxysilane, [2-(diethylamino)ethyl]trimethoxysilane, [3-(dimethylamino)propyl]trimethoxysilane, [3-(diethylamino)propyl]trimethoxysilane, [2-(dimethylamino)ethyl]triethoxysilane, [2-(diethylamino)ethyl]triethoxysilane, [3-(dimethylamino)propyl]triethoxysilane, and [3-(diethylamino)propyl]triethoxysilane.

Of the compounds represented by the formula (5-1), examples of a compound in which $R^{54}$ and $R^{55}$ are hydrocarbyl groups, two of $R^{51}$, $R^{52}$ and $R^{53}$ are hydrocarbyloxy groups, and one of them is a hydrocarbyl group include [(dialkylamino)alkyl]dihydrocarbyloxyalkylsilane compounds such as [2-(dimethylamino)ethyl]dimethoxymethylsilane, [2-(diethylamino)ethyl]dimethoxymethylsilane, [3-(dimethylamino)propyl]dimethoxymethylsilane, [3-(diethylamino)propyl]dimethoxymethylsilane, [2-(dimethylamino)ethyl]diethoxymethylsilane, [2-(diethylamino)ethyl]diethoxymethylsilane, [3-(dimethylamino)propyl]diethoxymethylsilane, and [3-(diethylamino)propyl]diethoxymethylsilane.

Of the compounds represented by the formula (5-1), examples of a compound in which $R^{54}$ and $R^{55}$ are bound to be a hydrocarbylene group, and $R^{51}$, $R^{52}$ and $T^{53}$ are hydrocarbyloxy groups include (cyclic aminoalkyl)trihydrocarbyloxysilane compounds such as (1-pyrrolidinylmethyl)trimethoxysilane, (piperidinomethyl)trimethoxysilane, (1-hexamethyleneiminomethyl)trimethoxysilane, [2-(1-pyrrolidinyl)ethyl]trimethoxysilane, (2-piperidinoethyl)trimethoxysilane, [2-(1-hexamethyleneimino)ethyl]trimethoxysilane, [3-(1-pyrrolidinyl)propyl]trimethoxysilane, (3-piperidinopropyl)trimethoxysilane, [3-(1-hexamethyleneimino)propyl]trimethoxysilane, [3-(1- pyrrolidinyl)propyl]triethoxysilane, (3-piperidinopropyl) triethoxysilane, and [3-(1-hexamethyleneimino)propyl] triethoxysilane.

Of the compounds represented by the formula (5-1), examples of a compound in which $R^{54}$ and $R^{55}$ are bound to be a heteroatom-containing hydrocarbylene group having a nitrogen atom as a heteroatom, and $R^{51}$, $R^{52}$, and $R^{53}$ are hydrocarbyloxy groups include 1-(2-trimethoxysilylethyl) imidazole, 1-(2-trimethoxysilylethyl)-4,5-dihydroimidazole, 1-(3-triethoxysilylpropyl)imidazole, and 1-(3-triethoxysilylpropyl)-4,5-dihydroimidazole.

Of the compounds represented by the formula (5-1), examples of a compound in which $R^{54}$ and $R^{55}$ are bound to be a heteroatom-containing hydrocarbylene group having an oxygen atom as a heteroatom, and $R^{51}$, $R^{52}$ and $R^{53}$ are hydrocarbyloxy groups include (2-morpholinoethyl) trimethoxysilane and (3-morpholinopropyl)trimethoxysilane.

Of the compounds represented by the formula (5-1), examples of a compound in which $R^{54}$ and $R^{55}$ are hydrocarbyl groups having a substituent, and $R^{51}$, $R^{52}$ and $R^{53}$ are hydrocarbyloxy groups include {[bis(tetrahydrofuranyl) amino]alkyl}trihydrocarbyloxysilane compounds such as {2-[bis(3-tetrahydrofuranyl)amino]ethyl}trimethoxysilane, {2-[bis(3-tetrahydrofuranyl)amino]ethyl}triethoxysilane, {3-[bis(3-tetrahydrofuranyl)amino]propyl}trimethoxysilane, and {3-[bis(3-tetrahydrofuranyl)amino]propyl}triethoxysilane.

Of the compounds represented by the formula (5-1), examples of a compound in which $R^{54}$ and $R^{55}$ are trialkylsilyl groups, two of $R^{51}$, $R^{52}$ and $R^{53}$ are hydrocarbyloxy groups, and the remainder is a hydrocarbyl group include {[N,N-bis(trialkylsilyl)amino]alkyl}dihydrocarbyloxyalkylsilane compounds such as {2-[N,N-bis(trimethylsilyl) amino]ethyl}dimethoxymethylsilane, {3-[N,N-bis(trimethylsilyl)amino]propyl}dimethoxymethylsilane, {2-[N,N-bis (trimethylsilyl)amino]ethyl}diethoxymethylsilane, and {3-[N,N-bis(trimethylsilyl)amino]propyl}diethoxymethylsilane.

The compound represented by the formula (5-1) is preferably a compound in which $R^{51}$, $R^{52}$ and $R^{53}$ are hydrocarbyloxy groups having 1 to 8 carbon atoms, or hydrocarbyl groups having 1 to 8 carbon atoms, at least one of $R^{51}$, $R^{52}$ and $R^{53}$ is a hydrocarbyloxy group having 1 to 8 carbon atoms, $R^{54}$ and $R^{55}$ are each a hydrocarbyl group having 1 to 8 carbon atoms, or a trialkylsilyl group having 3 to 7 carbon atoms, or $R^{54}$ and $R^{55}$ are bound to be a hydrocarbylene group having 2 to 10 carbon atoms, and j is an integer of 1 to 5. More preferable is a compound in which $R^{51}$, $R^{52}$ and $R^{53}$ are alkoxy groups having 1 to 6 carbon atoms, or alkyl groups having 1 to 6 carbon atoms, at least two of $R^{51}$, $R^{52}$ and $R^{53}$ are alkoxy groups having 1 to 6 carbon atoms, the remainder is an alkyl group having 1 to 6 carbon atoms, $R^{54}$ and $R^{55}$ are each an alkyl group having 1 to 5 carbon atoms, or a trialkylsilyl group having 3 to 7 carbon atoms, in which the number of carbon atoms of each alkyl group bound to a silicon atom is 1 to 4, or $R^{54}$ and $R^{55}$ are bound to be an alkanediyl group having 3 to 8 carbon atoms, and j is an integer of 1 to 5. Further preferable is a compound in which $R^{51}$, $R^{52}$ and $R^{53}$ are alkoxy groups having 1 to 4 carbon atoms, $R^{54}$ and $R^{55}$ are each a linear alkyl group having 1 to 3 carbon atoms, and j is 2 or 3.

The compound represented by the formula (5-1) is particularly preferably [2-(dimethylamino)ethyl]trimethoxysilane, [2-(diethylamino)ethyl]trimethoxysilane, [3-(dimethylamino)propyl]trimethoxysilane, or [3-(diethylamino) propyl]trimethoxysilane.

The hydrocarbyloxysilane compound preferable in the present invention may also be a compound represented by the following formula (5-2):

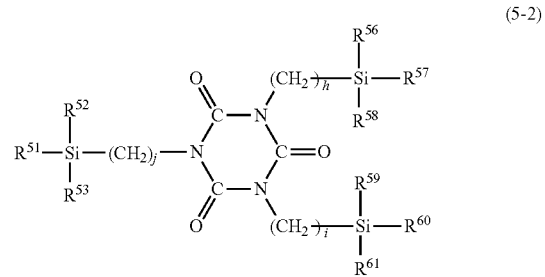

(5-2)

wherein $R^{51}$, $R^{52}$, $R^{53}$, $R^{56}$, $R^{57}$, $R^{58}$, $R^{59}$, $R^{60}$, $R^{61}$ は each represent a hydrocarbyl group or a hydrocarbyloxy group, at least one of $R^{51}$, $R^{52}$ and $R^{53}$ is a hydrocarbyloxy group, at least one of $R^{56}$, $R^{57}$ and $R^{58}$ is a hydrocarbyloxy group, at least one of $R^{59}$, $R^{60}$, $R^{61}$ is a hydrocarbyloxy group, and j, h and i each represent a integer of 1 to 5, which is represented by the formula (5) in which $A^5$ is a group represented by the formula (5-B).

Examples of the compound represented by the formula (5-2) include 1,3,5-tris(3-trimethoxysilylpropyl)isocyanurate, 1,3,5-tris(3-triethoxysilylpropyl)isocyanurate, 1,3,5-tris(3-tripropoxysilylpropyl)isocyanurate, 1,3,5-tris(3-tributoxysilylpropyl)isocyanurate, 1,3,5-tris(2-trimethoxysilylethyl)isocyanurate, and 1,3,5-tris(2-triethoxysilylethyl)isocyanurate.

The compound represented by the formula (5-2) is preferably a compound in which $R^{51}$, $R^{52}$, $R^{53}$, $R^{56}$, $R^{57}$, $R^{58}$, $R^{59}$, $R^{60}$ and $R^{61}$ each are an alkyl group having 1 to 6 carbons or an alkoxy group having 1 to 6 carbons, at least two of $R^{51}$, $R^{52}$ and $R^{53}$ are alkoxy groups having 1 to 6 carbons, at least two of $R^{56}$, $R^{57}$ and $R^{58}$ are alkoxy groups having 1 to 6 carbons, at least two of $R^{59}$, $R^{60}$ and $R^{61}$ are alkoxy groups having 1 to 6 carbons, and j, h and i each are 2 or 3, and more preferably a compound in which $R^{51}$, $R^{52}$, $R^{53}$, $R^{56}$, $R^{57}$, $R^{58}$, $R^{59}$, $R^{60}$ and $R^{61}$ each are alkoxy groups having 1 to 4 carbons, and j, h, and i each are 2 or 3.

The compound represented by the formula (5-2) is particularly preferably 1,3,5-tris[3-(trimethoxysilyl)propyl]isocyanurate.

In addition, examples of the compound represented by the formula (5) include a compound in which $A^5$ is a cyano group or an isocyanato group.

Examples of a compound in which $A^5$ in the formula (5) is a cyano group include (2-cyanoethyl)trimethoxysilane, (3-cyanopropyl)trimethoxysilane, (2-cyanoethyl)triethoxysilane, and (3-cyanopropyl)triethoxysilane.

Examples of a compound in which $A^5$ in the formula (5) is an isocyanato group include (2-isocyanatoethyl) trimethoxysilane, (3-isocyanatopropyl)trimethoxysilane, (2-isocyanatoethyl)triethoxysilane, and (3-isocyanatopropyl)triethoxysilane.

The amount of use of the hydrocarbyloxysilane compound is preferably 0.5 mmol or more, more preferably 1 mmol or more, per 100 g of the conjugated diene-based polymer. The amount of use is preferably 25 mmol or less, more preferably 10 mmol or less, further preferably 5 mmol or less.

The temperature at which a reaction product obtained by reacting the conjugated diene-based polymer with the organometallic compound is reacted with the hydrocarbyloxysilane compound is preferably 25° C. or higher, more preferably 35° C. or higher, further preferably 50° C. or higher. The temperature is preferably 100° C. or lower, more preferably 90° C. or lower, further preferably 80° C. or lower.

The time during which a reaction product obtained by reacting the conjugated diene-based polymer with the organometallic compound is reacted with the hydrocarbyloxysilane compound is preferably 60 seconds or longer, more preferably 5 minutes or longer. The time is preferably 5 hours or shorter, more preferably 1 hour or shorter.

Preferably, the modified conjugated diene-based polymer of the present invention is obtained by obtaining a polymerization solution containing a conjugated diene-based polymer by polymerizing a monomer component containing a conjugated diene compound and a compound represented by the formula (1) using an organometallic compound in a hydrocarbon solvent, adding an organometallic compound to the resulting polymerization solution to react the conjugated diene-based polymer with the organometallic compound and, thereafter, adding a hydrocarbyloxysilane compound to a solution containing the reaction product to react the reaction product with the hydrocarbyloxysilane compound.

As a method of recovering the resulting modified conjugated diene-based polymer, a known method can be used, and examples thereof include a method of adding a coagulating agent to a solution containing a conjugated diene-based polymer, and a method of adding steam to a solution containing a conjugated diene-based polymer. The recovered modified conjugated diene-based polymer may be dried with a known drier such as a band drier or an extrusion-type drier.

[Modified Conjugated Diene-Based Polymer]

The Mooney viscosity ($ML_{1+4}$) of the modified conjugated diene-based polymer of the present invention is preferably 10 or more, more preferably 20 or more in order to enhance the tensile strength at break. In addition, in order to enhance processability, the Mooney viscosity is preferably 200 or less, more preferably 150 or less. The Mooney viscosity ($ML_{1+4}$) is measured at 100° C. according to JIS K6300 (1994).

The molecular weight distribution of the modified conjugated diene-based polymer of the present invention is preferably 1 to 5, more preferably 1 to 2 in order to enhance the fuel cost saving effect. The molecular weight distribution is obtained by measuring the number average molecular weight (Mn) and the weight average molecular weight (Mw) by a gel permeation chromatography (GPC) method, and dividing Mw by Mn.

The amount of vinyl bonds of the modified conjugated diene-based polymer of the present invention is preferably 80 mol % or less, more preferably 70 mol % or less, letting the content of the conjugated diene unit be 100 mol %, in order to enhance the fuel cost saving effect. In addition, in order to enhance gripping properties, the amount of vinyl bonds is preferably 10 mol % or more, more preferably 15 mol % or more, further preferably 20 mol % or more, particularly preferably 40 mol % or more. The amount of vinyl bonds is obtained from the absorption intensity at around 910 $cm^{-1}$ which is an absorption peak of a vinyl group, by infrared spectroscopy.

[Polymer Composition]

The modified conjugated diene-based polymer of the present invention can be used in the form of a polymer composition obtained by blending other polymer components and additives therein.

Examples of the other polymer components include a styrene-butadiene copolymer, polybutadiene, a butadiene-isoprene copolymer, a butyl rubber, a natural rubber, an ethylene-propylene copolymer and an ethylene-octene copolymer. One or more kinds of them are used.

When the other polymer components are blended in the modified conjugated diene-based polymer of the present invention, the blending amount of the modified conjugated diene-based polymer of the present invention is preferably 10% by weight or more, more preferably 20% by weight or more, letting the total blending amount of a polymer component (including the blending amount of the conjugated diene-based polymer of the present invention) be 100% by weight, in order to enhance the fuel cost saving effect.

Examples of the additive include a vulcanizing agent, a vulcanization accelerator, a vulcanization activator, an organic peroxide, a reinforcing agent, a filler, a silane coupling agent, an extender oil, a processing aid, an anti-aging agent, and a lubricant.

Examples of the vulcanizing agent include sulfur. Examples of sulfur include powdery sulfur, precipitated sulfur, colloidal sulfur, insoluble sulfur, and highly-dispersible sulfur. The blending amount of the vulcanizing agent is preferably 0.1 part by weight to 15 parts by weight, more preferably 0.3 part by weight to 10 parts by weight, further preferably 0.5 part by weight to 5 parts by weight per 100 parts by weight of the polymer component.

Examples of the vulcanization accelerator include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethylthiuram monosulfide and tetramethylthiuram disulfide; sulfenamide-based vulcanization accelerators such as N-cyclohexyl-2-benzothiazolesulfenamide, N-tert-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotolylguanidine, and orthotolylbiguanidine. The blending amount of the vulcanization accelerator is preferably 0.1 part by weight to 5 parts by weight, more preferably 0.2 part by weight to 3 parts by weight per 100 parts by weight of the polymer component.

Examples of the vulcanization activator include stearic acid and zinc oxide. Examples of the organic peroxide include dicumyl peroxide and ditertiarybutyl peroxide.

Examples of the reinforcing agent include a silica-based reinforcing agent and carbon black.

Examples of the silica-based reinforcing agent include dry silica (anhydrous silicic acid), wet silica (hydrous silicic acid), colloidal silica, precipitated silica, calcium silicate, and aluminum silicate. One or more kinds of them can be used. The BET specific surface area of the silica-based reinforcing agent is preferably 50 $m^2/g$ to 250 $m^2/g$. The BET specific surface area is measured according to ASTM D1993-03. As a commercially available product, trade name Ultrasil VN3-G manufactured by Degussa, trade names VN3, AQ, ER, and RS-150 manufactured by Tosoh Silica Corporation, and trade names Zeosil 1115MP and 1165 MP manufactured by Rhodia can be used.

Examples of carbon black include channel carbon black such as EPC, MPC and CC; furnace carbon black such as SAF, ISAF, HAF, MAF, FEF, SRF, GPF, APF, FF, CF, SCF and ECF; thermal carbon black such as FT and MT; acetylene carbon black; and graphite. One or more kinds of them can be used.

The nitrogen adsorption specific surface area ($N_2SA$) of carbon black is preferably 5 $m^2/g$ to 200 $m^2/g$, and the dibutyl phthalate (DBP) absorption amount of carbon black is preferably 5 ml/100 g to 300 ml/100 g. The nitrogen adsorption specific surface area is measured according to ASTM D4820-93, and the DBP absorption amount is measured according to ASTM D2414-93. As a commercially available product, trade name DIABLACK N339 manufactured by Mitsubishi Chemical Corporation, trade names SEAST 6, SEAST 7HM, and SEAST KH manufactured by Tokai Carbon Co., Ltd., and trade names CK 3 and Special Black 4A manufactured by Degussa can be used.

When the reinforcing agent is blended in the modified conjugated diene-based polymer of the present invention to formulate the blend into a polymer composition, the blending amount of the reinforcing agent is preferably 10 parts by weight to 150 parts by weight per 100 parts by weight of the blending amount of the conjugated diene-based polymer of the present invention. In order to enhance abrasion resistance and strength, the blending amount is more preferably 20 parts by weight or more, further preferably 30 parts by weight or more. In order to enhance reinforcing properties, the blending amount is more preferably 120 parts by weight or less, further preferably 100 parts by weight or less.

When the reinforcing agent is blended in the modified conjugated diene-based polymer of the present invention to formulate the blend into a polymer composition, it is preferable to use a silica-based reinforcing agent as the reinforcing agent in order to enhance the fuel cost saving effect. The blending amount of the silica-based reinforcing agent is preferably 50 parts by weight or more, more preferably 70 parts by weight or more, letting the total blending amount of the reinforcing agent be 100 parts by weight.

The weight ratio of the content of the silica-based reinforcing agent to the content of carbon black (content of silica content of carbon black) is preferably 2:1 to 50:1. It is more preferable that the weight ratio is 5:1 to 20:1 in order to enhance the fuel cost saving effect, and enhance reinforcing properties.

Examples of the filler include calcium carbonate, talc, alumina, clay, aluminum hydroxide, and mica.

Examples of the silane coupling agent include vinyltrichlorosilane, vinyltriethoxysilane, vinyltris(β-methoxyethoxy)silane, β-(3,4-epoxychlorohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl) tetrasulfide, γ-trimethoxysilylpropyldimethylthiocarbamyl tetrasulfide, and γ-trimethoxysilylpropylbenzothiazyl tetrasulfide. One or more kinds of them are used. As a commercially available product, trade names Si69 and Si75 manufactured by Degussa can be used.

When the silane coupling agent is blended in the modified conjugated diene-based polymer of the present invention to formulate the blend into a polymer composition, the blending amount of the silane coupling agent is preferably 1 part by weight to 20 parts by weight, more preferably 2 parts by weight to 15 parts by weight, further preferably 5 parts by weight to 10 parts by weight per 100 parts by weight of silica.

Examples of the extender oil include an aromatic mineral oil (viscosity gravity constant (V.G.C. value) 0.900 to 1.049), a naphthene mineral oil (V.G.C. value 0.850 to 0.899), and a paraffin mineral oil (V.G.C. value 0.790 to 0.849). The content of polycyclic aromatics of the extender oil is preferably less than 3% by weight, more preferably less than 1% by weight. The content of polycyclic aromatics is measured according to method 346/92 of the Institute of Petroleum (UK). In addition, the content of aromatic compounds (CA) of the extender oil is preferably 20% by weight or more. One or more kinds of these extender oils are used.

Examples of a process for producing a polymer composition by blending the other polymer components and additives in the modified conjugated diene-based polymer of the present invention include a process of kneading the modified conjugated diene-based polymer of the present invention, other polymer components, and additives using a kneading machine. Examples of the kneading machine include a roll kneading machine and a Banbury mixer.

As the kneading conditions when the components are kneaded using a kneading machine, when an additive other than the vulcanizing agent and the vulcanization accelerator is blended, the kneading temperature is usually 50° C. to 200° C., preferably 80° C. to 190° C. and, when the vulcanizing agent and the vulcanization accelerator are blended, the kneading temperature is usually 100° C. or lower, preferably room temperature to 80° C. The kneading time is usually 30 seconds to 30 minutes, preferably 1 minute to 30 minutes. In addition, a composition with the vulcanizing agent and the vulcanization accelerator blended therein is usually used after being subjected to a vulcanization treatment such as press vulcanization. The vulcanization temperature is usually 120° C. to 200° C., preferably 140° C. to 180° C.

The polymer composition of the present invention is excellent in the fuel cost saving effect, and is suitably used in tires.

EXAMPLES

Physical property assessment was performed by the following methods.
1. Mooney Viscosity ($ML_{1+4}$)
The Mooney viscosity of a polymer was measured at 100° C. according to JIS K6300 (1994).
2. Amount of Vinyl Bonds (Unit: mol %)
The amount of vinyl bonds of a polymer was obtained from an absorption intensity at around 910 $cm^{-1}$ which is an absorption peak of a vinyl group, by infrared spectroscopy.
3. Content of Styrene Unit (Unit: % by Weight)
The content of a styrene unit of a polymer was obtained from a refractive index according to JIS K6383 (1995).
4. Molecular Weight Distribution (Mw/Mn)
The weight average molecular weight (Mw) and the number average molecular weight (Mn) were measured by a gel permeation chromatography (GPC) method under the following conditions (1) to (8), and the molecular weight distribution (Mw/Mn) of a polymer was obtained.
(1) Apparatus: HLC-8220 manufactured by Tosoh Corporation
(2) Separation column: TSKgel SuperHM-H (two columns in series) manufacture by Tosoh Corporation
(3) Measuring temperature: 40° C.
(4) Carrier: tetrahydrofuran (5) Flow rate: 0.6 mL/min
(6) Injection amount: 5 µL
(7) Detector: differential refraction
(8) Molecular weight standard: standard polystyrene 5. Fuel Cost Saving Effect A strip-like test piece of 4 mm in width, 40 mm in length and 1.2 mm in thickness was punched out from a sheet-like vulcanized molding, and was subjected to a test. In the measurement, the loss tangent of a test piece at a temperature of 70° C. (tan δ (70° C.)) was measured with a viscoelasticity measuring apparatus (manufactured by Ueshima Seisakusho Co., Ltd.) under the conditions of a strain of 1% and a frequency of 10 Hz. As this value is smaller, the fuel cost saving effect is excellent.

6. Gripping Properties

A strip-like test piece of 4 mm in width, 40 mm in length and 1.2 mm in thickness was punched out from a sheet-like vulcanized molding, and was subjected to a test. In the measurement, the loss tangent of a test piece at a temperature of 0° C. (tan δ (0° C.)) was measured with a viscoelasticity measuring apparatus (manufactured by Ueshima Seisakusho Co., Ltd.) under the conditions of a strain of 2.5% and a frequency of 10 Hz. As this value is larger, gripping properties are excellent.

7. Tensile Strength at Break (TB, Unit: MPa)

According to JIS K6251, using a No. 3 dumbbell test piece, the stress at break of the test piece was measured at a tension rate of 500 mm/min.

8. Elongation at Break (EB, unit: %)

According to JIS K6251, using a No. 3 dumbbell test piece, the elongation at break of the test piece was measured at a tension rate of 500 mm/min.

Example 1

A polymerization reactor made of stainless steel equipped with a stirring device of an internal volume of 20 L was washed, dried, and the inner atmosphere was replaced with dry nitrogen. Then, 10.2 kg of industrial hexane (density 680 kg/m$^3$), 608 g of 1,3-butadiene, 192 g of styrene, 4.53 g (38.4 mmol) of 4-glycol diethyl ether were placed into the polymerization reactor. Then, an n-hexane solution of n-butyllithium (n-butyllithium content 14.4 mmol) was placed into the polymerization reactor, and a polymerization reaction was initiated.

A copolymerization reaction of 1,3-butadiene, styrene, and 4-methylstyrene was performed at a temperature in the polymerization reactor of 65° C. and a stirring rate of 130 rpm for 3 hours, while 1,3-butadiene and styrene were continuously supplied to the polymerization reactor. The supply amount of 1,3-butadiene was 912 g, and the supply amount of styrene was 288 g.

To the polymer solution was added 20 ml of a hexane solution containing 1.2 ml of 1-butanol, and the polymer solution was stirred for 15 minutes.

Then, a cyclohexane solution of sec-butyllithium (sec-butyllithium content 64.0 mmol), and 11.5 ml (77.2 mmol) of 1,1,2,2-tetramethylethylenediamine were placed into the polymerization reactor, followed by stirring for 30 minutes.

Further, 64.0 mmol of [3-(diethylamino)propyl]trimethoxysilane was added, followed by stirring for 15 minutes.

To the polymer solution was added 20 ml of a hexane solution containing 4.0 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM manufactured by Sumitomo Chemical Co., Ltd.), and 4.0 g of pentaerythrityltetrakis(3-laurylthiopropionate) (trade name: Sumilizer TP-D manufactured by Sumitomo Chemical Co., Ltd.), then, the polymer solution was allowed to stand at room temperature for 16 hours, and the solvent was evaporated to obtain a polymer. Thereafter, the resulting polymer was further dried at 55° C. for 6 hours under reduced pressure. Assessment results of the polymer are shown in Table 1.

Then, 100 parts by weight of the resulting polymer, 78.4 parts by weight of silica (trade name: Ultrasil VN3-G manufactured by Degussa), 6.4 parts by weight of a silane coupling agent (trade name: Si69 manufactured by Degussa), 6.4 parts by weight of carbon black (trade name: DIABLACK N339 manufactured by Mitsubishi Chemical Corporation), 47.6 parts by weight of an extender oil (trade name: JOMO Process NC-140 manufactured by Japan Energy Corporation), 1.5 parts by weight of an antiaging agent (trade name: Antigen 3C manufactured by Sumitomo Chemical Co., Ltd.), 2 parts by weight of stearic acid, 2 parts by weight of zinc flower, 1 part by weight of a vulcanization accelerator (trade name: Soxinol CZ manufactured by Sumitomo Chemical Co., Ltd.), 1 part by weight of a vulcanization accelerator (trade name: Soxinol D manufactured by Sumitomo Chemical Co., Ltd.), 1.5 parts by weight of a wax (trade name: Sunnoc N manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated to vulcanize at 160° C. for 45 minutes to prepare a vulcanized sheet of 150 mm in width, 150 mm in length, and 1.2 mm in thickness. The results of physical property assessment of the vulcanized sheet are shown in Table 1.

Example 2

A polymerization reactor made of stainless steel equipped with a stirring device of an internal volume of 20 L was washed, dried, and replaced with dry nitrogen. Then, 10.2 kg of industrial hexane (density 680 kg/m$^3$), 608 g of 1,3-butadiene, 192 g of styrene, 1.51 g (12.8 mmol) of 4-methylstyrene, 6.1 ml of tetrahydrofuran, and 4.4 ml of ethylene glycol diethyl ether were placed into the polymerization reactor. Then, an n-hexane solution of n-butyllithium (n-butyllithium content 14.4 mmol) was placed into the polymerization reactor, and a polymerization reaction was initiated.

A copolymerization reaction of 1,3-butadiene, styrene and 4-methylstyrene was performed at a temperature in the polymerization reactor of 65° C. and a stirring rate of 130 rpm, while 1,3-butadiene and styrene were continuously supplied to the polymerization reactor.

After 20 minutes from polymerization initiation, 20 ml of a hexane solution containing 1.51 g (12.8 mmol) of 4-methylstyrene was rapidly placed into the polymerization reactor at a polymerization temperature of 65° C. and a stirring rate of 130 rpm.

After 20 minutes from that (after 40 minutes from polymerization initiation), 20 ml of a hexane solution containing 1.51 g (12.8 mmol) of 4-methylstyrene was rapidly placed into the polymerization reactor at a polymerization temperature of 65° C. and a stirring rate of 130 rpm.

After 2 hours and 20 minutes from that (after 3 hours from polymerization initiation), 20 ml of a hexane solution containing 1.2 ml of 1-butanol was added to the polymer solution, and the polymer solution was stirred for 15 minutes. The supply amount of 1,3-butadiene in polymerization was 912 g, and the supply amount of styrene was 288 g.

Then, a cyclohexane solution of sec-butyllithium (sec-butyllithium content 64.0 mmol), and 11.5 ml (77.2 mmol) of 1,1,2,2-tetramethylethylenediamine were placed into the polymerization reactor, followed by stirring for 30 minutes.

Further, 64.0 mmol of [3-(diethylamino)propyl] trimethoxysilane was added, followed by stirring for 15 minutes.

To the polymer solution was added 20 ml of a hexane solution containing 4.0 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM manufactured by Sumitomo Chemical Co., Ltd.), and 4.0 g of pentaerythrityltetrakis(3-laurylthiopropionate) (trade name: Sumilizer TP-D manufactured by Sumitomo Chemical Co., Ltd.), then, the polymer solution was allowed to stand at room temperature for 16 hours, and the solvent was evaporated to obtain a polymer. Thereafter, the resulting polymer was further dried at 55° C. for 6 hours under reduced pressure. Assessment results of the polymer are shown in Table 1.

Then, 100 parts by weight of the resulting polymer, 78.4 parts by weight of silica (trade name: Ultrasil VN3-G manufactured by Degussa), 6.4 parts by weight of a silane coupling agent (trade name: Si69 manufactured by Degussa), 6.4 parts by weight of carbon black (trade name: DIABLACK N339 manufactured by Mitsubishi Chemical Corporation), 47.6 parts by weight of an extender oil (trade name: JOMO Process NC-140 manufactured by Japan Energy Corporation), 1.5 parts by weight of an antiaging agent (trade name: Antigen 3C manufactured by Sumitomo Chemical Co., Ltd.), 2 parts by weight of stearic acid, 2 parts by weight of zinc flower, 1 part by weight of a vulcanization accelerator (trade name: Soxinol CZ manufactured by Sumitomo Chemical Co., Ltd.), 1 part by weight of a vulcanization accelerator (trade name: Soxinol D manufactured by Sumitomo Chemical Co., Ltd.), 1.5 parts by weight of a wax (trade name: Sunnoc N manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated to vulcanize at 160° C. for 45 minutes to prepare a vulcanized sheet of 150 mm in width, 150 mm in length, and 1.2 mm in thickness. The results of physical property assessment of the vulcanized sheet are shown in Table 1.

Example 3

A polymerization reactor made of stainless steel equipped with a stirring device of an internal volume of 5 L was washed, dried, and replaced with dry nitrogen. Then, 2.55 kg of industrial hexane (density 680 kg/m$^3$), 137 g of 1,3-butadiene, 43 g of styrene, 1.70 g (14.4 mmol) of 4-methylstyrene, 1.52 ml of tetrahydrofuran, and 1.09 ml of ethylene glycol diethyl ether were placed into the polymerization reactor. Then, an n-hexane solution of n-butyllithium (n-butyllithium content 3.61 mmol) was placed into the polymerization reactor, and a polymerization reaction was initiated.

A copolymerization reaction of 1,3-butadiene, styrene, and 4-methylstyrene was performed at a temperature in the polymerization reactor of 65° C. and a stirring rate of 130 rpm for 2 hours and 30 minutes, while 1,3-butadiene and styrene were continuously supplied to the polymerization reactor. The supply amount of 1,3-butadiene was 205 g, and the supply amount of styrene was 65 g.

To the polymer solution was added 5 ml of a hexane solution containing 0.26 ml of 1-butanol, and the polymer solution was stirred for 15 minutes.

Then, a cyclohexane solution of sec-butyllithium (sec-butyllithium content 23.8 mmol), and 4.32 ml (29.0 mmol) of 1,1,2,2-tetramethylethylenediamine were placed into the polymerization reactor, followed by stirring for 30 minutes.

Further, 23.8 mmol of [3-(diethylamino)propyl] trimethoxysilane was added, followed by stirring for 15 minutes.

To the polymer solution was added 5 ml of a hexane solution containing 1.0 ml of methanol, and the polymer solution was stirred for 5 minutes. Then, to the polymer solution were added 1.8 g of 2-tert-butyl-6-(3-tert-butyl-2-hydroxy-5-methylbenzyl)-4-methylphenyl acrylate (trade name: Sumilizer GM manufactured by Sumitomo Chemical Co., Ltd.), and 0.9 g of pentaerythrityltetrakis(3-laurylthiopropionate) (trade name: Sumilizer TP-D manufactured by Sumitomo Chemical Co., Ltd.), then, the polymer solution was allowed to stand at room temperature for 16 hours, and the solvent was evaporated to obtain a polymer. Thereafter, the resulting polymer was further dried at 55° C. for 6 hours under reduced pressure. Assessment results of the polymer are shown in Table 1.

Then, 100 parts by weight of the resulting polymer, 78.4 parts by weight of silica (trade name: Ultrasil VN3-G manufactured by Degussa), 6.4 parts by weight of a silane coupling agent (trade name: Si69 manufactured by Degussa), 6.4 parts by weight of carbon black (trade name: DIABLACK N339 manufactured by Mitsubishi Chemical Corporation), 47.6 parts by weight of an extender oil (trade name: JOMO Process NC-140 manufactured by Japan Energy Corporation), 1.5 parts by weight of an antiaging agent (trade name: Antigen 3C manufactured by Sumitomo Chemical Co., Ltd.), 2 parts by weight of stearic acid, 2 parts by weight of zinc flower, 1 part by weight of a vulcanization accelerator (trade name: Soxinol CZ manufactured by Sumitomo Chemical Co., Ltd.), 1 part by weight of a vulcanization accelerator (trade name: Soxinol D manufactured by Sumitomo Chemical Co., Ltd.), 1.5 parts by weight of a wax (trade name: Sunnoc N manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated to vulcanize at 160° C. for 45 minutes to prepare a vulcanized sheet of 150 mm in width, 150 mm in length, and 1.2 mm in thickness. The results of physical property assessment of the vulcanized sheet are shown in Table 1.

Example 4

A polymerization reactor made of stainless steel equipped with a stirring device of an internal volume of 5 L was washed, dried, and replaced with dry nitrogen. Then, 2.55 kg of industrial hexane (density 680 kg/m$^3$), 137 g of 1,3-butadiene, 43 g of styrene, 3.39 g (28.7 mmol) of 4-methylstyrene, 1.52 ml of tetrahydrofuran, and 1.09 ml of ethylene glycol diethyl ether were placed into the polymerization reactor. Then, an n-hexane solution of n-butyllithium (n-butyllithium content 3.61 mmol) was placed into the polymerization reactor, and a polymerization reaction was initiated.

A copolymerization reaction of 1,3-butadiene, styrene, and 4-methylstyrene was performed at a temperature in the polymerization reactor of 65° C. and a stirring rate of 130 rpm for 2 hours and 30 minutes, while 1,3-butadiene and styrene were continuously supplied to the polymerization reactor. The supply amount of 1,3-butadiene was 205 g, and the supply amount of styrene was 65 g.

To the polymer solution was added 5 ml of a hexane solution containing 0.26 ml of 1-butanol, and the polymer solution was stirred for 15 minutes.

Then, a cyclohexane solution of sec-butyllithium (sec-butyllithium content 43.1 mmol), and 7.70 ml (51.7 mmol) of 1,1,2,2,-tetramethylethylenediamine were placed into the polymerization reactor, followed by stirring for 30 minutes.

Further, 43.1 mmol of [3-(diethylamino)propyl]trimethoxysilane was added, followed by stirring for 15 minutes.

To the polymer solution was added 10 ml of a hexane solution containing 2.6 ml of methanol, and the polymer solution was stirred for 5 minutes. Then, to the polymer solution were added 1.8 g of 2-tert-butyl-6-(3-tert-butyl-2-hydroxy-5-methylbenzyl)-4-methylphenyl acrylate (trade name: Sumilizer GM manufactured by Sumitomo Chemical Co., Ltd.), and 0.9 g of pentaerythrityltetrakis(3-laurylthiopropionate) (trade name: Sumilizer TP-D manufactured by Sumitomo Chemical Co., Ltd.), then, the polymer solution was allowed to stand at room temperature for 16 hours, and the solvent was evaporated to obtain a polymer. Thereafter, the resulting polymer was further dried at 55° C. for 6 hours under reduced pressure. Assessment results of the polymer are shown in Table 1.

Then, 100 parts by weight of the resulting polymer, 78.4 parts by weight of silica (trade name: Ultrasil VN3-G manufactured by Degussa), 6.4 parts by weight of a silane coupling agent (trade name: Si69 manufactured by Degussa), 6.4 parts by weight of carbon black (trade name: DIABLACK N339 manufactured by Mitsubishi Chemical Corporation), 47.6 parts by weight of an extender oil (trade name: JOMO Process NC-140 manufactured by Japan Energy Corporation), 1.5 parts by weight of an antiaging agent (trade name: Antigen 3C manufactured by Sumitomo Chemical Co., Ltd.), 2 parts by weight of stearic acid, 2 parts by weight of zinc flower, 1 part by weight of a vulcanization accelerator (trade name: Soxinol CZ manufactured by Sumitomo Chemical Co., Ltd.), 1 part by weight of a vulcanization accelerator (trade name: Soxinol D manufactured by Sumitomo Chemical Co., Ltd.), 1.5 parts by weight of a wax (trade name: Sunnoc N manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated to vulcanize at 160° C. for 45 minutes to prepare a vulcanized sheet of 150 mm in width, 150 mm in length, and 1.2 mm in thickness. The results of physical property assessment of the vulcanized sheet are shown in Table 1.

Example 5

A polymerization reactor made of stainless steel equipped with a stirring device of an internal volume of 20 L was washed, dried, and replaced with dry nitrogen. Then, 10.2 kg of industrial hexane (density 680 kg/m$^3$), 608 g of 1,3-butadiene, 192 g of styrene, 4.56 g (38.6 mmol) of 4-methylstyrene, 6.1 ml of tetrahydrofuran, and 4.4 ml of ethylene glycol diethyl ether were placed into the polymerization reactor. Then, an n-hexane solution of n-butyllithium (n-butyllithium content 15.5 mmol) was placed into the polymerization reactor, and a polymerization reaction was initiated.

A copolymerization reaction of 1,3-butadiene, styrene, and 4-methylstyrene was performed at a temperature in the polymerization reactor of 65° C. and a stirring rate of 130 rpm for 3 hours, while 1,3-butadiene and styrene were continuously supplied to the polymerization reactor. The supply amount of 1,3-butadiene was 912 g, and the supply amount of styrene was 288 g.

Into the polymer solution were placed a cyclohexane solution of sec-butyllithium (sec-butyllithium content 64.3 mmol), and 11.6 ml (77.8 mmol) of 1,1,2,2-tetramethylethylenediamine, followed by stirring for 60 minutes.

Further, 77.1 mmol of [3-(diethylamino)propyl]trimethoxysilane was added, followed by stirring for 15 minutes.

To the polymer solution was added 20 ml of a hexane solution containing 2.6 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM manufactured by Sumitomo Chemical Co., Ltd.), and 4.0 g of pentaerythrityltetrakis(3-laurylthiopropionate) (trade name: Sumilizer TP-D manufactured by Sumitomo Chemical Co., Ltd.), then, the polymer solution was allowed to stand at room temperature for 16 hours, and the solvent was evaporated to obtain a polymer. Thereafter, the resulting polymer was further dried at 55° C. for 6 hours under reduced pressure. Assessment results of the polymer are shown in Table 2.

Then, 100 parts by weight of the resulting polymer, 78.4 parts by weight of silica (trade name: Ultrasil VN3-G manufactured by Degussa), 6.4 parts by weight of a silane coupling agent (trade name: Si69 manufactured by Degussa), 6.4 parts by weight of carbon black (trade name: DIABLACK N339 manufactured by Mitsubishi Chemical Corporation), 47.6 parts by weight of an extender oil (trade name: JOMO Process NC-140 manufactured by Japan Energy Corporation), 1.5 parts by weight of an antiaging agent (trade name: Antigen 3C manufactured by Sumitomo Chemical Co., Ltd.), 2 parts by weight of stearic acid, 2 parts by weight of zinc flower, 1 part by weight of a vulcanization accelerator (trade name: Soxinol CZ manufactured by Sumitomo Chemical Co., Ltd.), 1 part by weight of a vulcanization accelerator (trade name: Soxinol D manufactured by Sumitomo Chemical Co., Ltd.), 1.5 parts by weight of a wax (trade name: Sunnoc N manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated to vulcanize at 160° C. for 45 minutes to prepare a vulcanized sheet of 150 mm in width, 150 mm in length, and 1.2 mm in thickness. The results of physical property assessment of the vulcanized sheet are shown in Table 2.

Example 6

A polymerization reactor made of stainless steel equipped with a stirring device of an internal volume of 20 L was washed, dried, and replaced with dry nitrogen. Then, 10.2 kg of industrial hexane (density 680 kg/m$^3$), 608 g of 1,3-butadiene, 192 g of styrene, 4.53 g (38.4 mmol) of 4-methylstyrene, 6.1 ml of tetrahydrofuran, and 4.4 ml of ethylene glycol diethyl ether were placed into the polymerization reactor. Then, an n-hexane solution of n-butyllithium (n-butyllithium content 14.9 mmol) was placed into the polymerization reactor, and a polymerization reaction was initiated.

A copolymerization reaction of 1,3-butadiene, styrene, and 4-methylstyrene was performed at a temperature in the polymerization reactor of 65° C. and a stirring rate of 130 rpm for 3 hours, while 1,3-butadiene and styrene were continuously supplied to the polymerization reactor. The supply amount of 1,3-butadiene was 912 g, and the supply amount of styrene was 288 g.

Then, the resulting polymerization reaction solution was stirred at a stirring rate of 130 rpm, and 12.8 mmol of N-[3-(dimethylamino)propyl]acrylamide was added, followed by stirring for 15 minutes.

Then, a cyclohexane solution of sec-butyllithium (sec-butyllithium content 64.3 mmol), and 11.5 ml (77.2 mmol) of 1,1,2,2-tetramethylethylenediamine were placed into the polymerization reactor, followed by stirring for 30 minutes.

Further, 64.0 mmol of [3-(diethylamino)propyl]trimethoxysilane was added, followed by stirring for 15 minutes.

To the polymer solution was added 20 ml of a hexane solution containing 4.0 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM manufactured by Sumitomo Chemical Co., Ltd.), and 4.0 g of pentaerythrityltetrakis(3-laurylthiopropionate) (trade name: Sumilizer TP-D manufactured by Sumitomo Chemical Co., Ltd.), then, the polymer solution was allowed to stand at room temperature for 16 hours, and the solvent was evaporated to obtain a polymer. Thereafter, the resulting polymer was further dried at 55° C. for 6 hours under reduced pressure. Assessment results of the polymer are shown in Table 2.

Then, 100 parts by weight of the resulting polymer, 78.4 parts by weight of silica (trade name: Ultrasil VN3-G manufactured by Degussa), 6.4 parts by weight of a silane coupling agent (trade name: Si69 manufactured by Degussa), 6.4 parts by weight of carbon black (trade name: DIABLACK N339 manufactured by Mitsubishi Chemical Corporation), 47.6 parts by weight of an extender oil (trade name: JOMO Process NC-140 manufactured by Japan Energy Corporation), 1.5 parts by weight of an antiaging agent (trade name: Antigen 3C manufactured by Sumitomo Chemical Co., Ltd.), 2 parts by weight of stearic acid, 2 parts by weight of zinc flower, 1 part by weight of a vulcanization accelerator (trade name: Soxinol CZ manufactured by Sumitomo Chemical Co., Ltd.), 1 part by weight of a vulcanization accelerator (trade name: Soxinol D manufactured by Sumitomo Chemical Co., Ltd.), 1.5 parts by weight of a wax (trade name: Sunnoc N manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated to vulcanize at 160° C. for 45 minutes to prepare a vulcanized sheet of 150 mm in width, 150 mm in length, and 1.2 mm in thickness. The results of physical property assessment of the vulcanized sheet are shown in Table 2.

Example 7

A polymerization reactor made of stainless steel equipped with a stirring device of an internal volume of 5 L was washed, dried, and replaced with dry nitrogen. Then, 2.55 kg of industrial hexane (density 680 kg/m$^3$), 137 g of 1,3-butadiene, 43 g of styrene, 1.02 g (8.06 mmol) of 4-methylstyrene, 1.52 ml of tetrahydrofuran, and 1.09 ml of ethylene glycol diethyl ether were placed into the polymerization reactor. Then, 4.37 mmol of a compound obtained by reacting 3-(N,N-dimethylamino)-1-propyllithium with isoprene [reaction rate: isoprene/3-(N,N-dimethylamino)-1-propyllithium=2/1 (in molar ratio), AI-200CE2 manufactured by FMC (cyclohexane solution)], as a cyclohexane solution, was placed into the polymerization reactor, and a polymerization reaction was initiated.

A copolymerization reaction of 1,3-butadiene, styrene, and 4-methylstyrene was performed at a temperature in the polymerization reactor of 65° C. and a stirring rate of 130 rpm for 3 hours, while 1,3-butadiene and styrene were continuously supplied to the polymerization reactor. The supply amount of 1,3-butadiene was 205 g, and the supply amount of styrene was 65 g.

To the polymer solution was added 5 ml of a hexane solution containing 0.26 ml of 1-butanol, and the polymer solution was stirred for 15 minutes.

Then, a cyclohexane solution of sec-butyllithium (sec-butyllithium content 14.4 mmol), and 2.59 ml (17.4 mmol) of 1,1,2,2-tetramethylethylenediamine were placed into the polymerization reactor, followed by stirring for 30 minutes.

Further, 14.4 mmol of [3-(diethylamino)propyl]trimethoxysilane was added, followed by stirring for 15 minutes.

To the polymer solution was added 5 ml of a hexane solution containing 1.0 ml of methanol, and the polymer solution was stirred for 5 minutes. Then, to the polymer solution were added 1.8 g of 2-tert-butyl-6-(3-tert-butyl-2-hydroxy-5-methylbenzyl)-4-methylphenyl acrylate (trade name: Sumilizer GM manufactured by Sumitomo Chemical Co., Ltd.), and 0.9 g of pentaerythrityltetrakis(3-laurylthiopropionate) (trade name: Sumilizer TP-D manufactured by Sumitomo Chemical Co., Ltd.), then, the polymer solution was allowed to stand at room temperature for 16 hours, and the solvent was evaporated to obtain a polymer. Thereafter, the resulting polymer was further dried at 55° C. for 6 hours under reduced pressure. Assessment results of the polymer are shown in Table 2.

Then, 100 parts by weight of the resulting polymer, 78.4 parts by weight of silica (trade name: Ultrasil VN3-G manufactured by Degussa), 6.4 parts by weight of a silane coupling agent (trade name: Si69 manufactured by Degussa), 6.4 parts by weight of carbon black (trade name: DIABLACK N339 manufactured by Mitsubishi Chemical Corporation), 47.6 parts by weight of an extender oil (trade name: JOMO Process NC-140 manufactured by Japan Energy Corporation), 1.5 parts by weight of an antiaging agent (trade name: Antigen 3C manufactured by Sumitomo Chemical Co., Ltd.), 2 parts by weight of stearic acid, 2 parts by weight of zinc flower, 1 part by weight of a vulcanization accelerator (trade name: Soxinol CZ manufactured by Sumitomo Chemical Co., Ltd.), 1 part by weight of a vulcanization accelerator (trade name: Soxinol D manufactured by Sumitomo Chemical Co., Ltd.), 1.5 parts by weight of a wax (trade name: Sunnoc N manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated to vulcanize at 160° C. for 45 minutes to prepare a vulcanized sheet of 150 mm in width, 150 mm in length, and 1.2 mm in thickness. The results of physical property assessment of the vulcanized sheet are shown in Table 2.

Example 8

A polymerization reactor made of stainless steel equipped with a stirring device of an internal volume of 20 L was washed, dried, and replaced with dry nitrogen. Then, 10.2 kg of industrial hexane (density 680 kg/m$^3$), 608 g of 1,3-butadiene, 192 g of styrene, 1.51 g of 4-methylstyrene, 6.1 ml of tetrahydrofuran, and 4.4 ml of ethylene glycol diethyl ether were placed into the polymerization reactor. Then, 12.8 mmol of a compound obtained by reacting 3-(N,N-dimethylamino)-1-propyllithium with isoprene [reaction rate: isoprene/34N,N-dimethylamino)-1-propyllithium=2/1 (in molar ratio), AI-200CE2 manufactured by FMC (cyclohexane solution)], as a cyclohexane solution, was placed into the polymerization reactor, and a polymerization reaction was initiated.

A copolymerization reaction of 1,3-butadiene, styrene, and 4-methylstyrene was performed at a temperature in the polymerization reactor of 65° C. and a stirring rate of 130 rpm for 3 hours, while 1,3-butadiene and styrene were continuously supplied to the polymerization reactor. The supply amount of 1,3-butadiene was 912 g, and the supply amount of styrene was 288 g.

After 20 minutes from polymerization initiation, 20 ml of a hexane solution containing 1.51 g of 4-methylstyrene was rapidly placed into the polymerization reactor at a polymerization temperature of 65° C. and a stirring rate of 130 rpm.

After 40 minutes from that (after 60 minutes from polymerization initiation), 20 ml of a hexane solution containing 1.51 g of 4-methylstyrene was rapidly placed into the polymerization reactor at a polymerization temperature of 65° C. and a stirring rate of 130 rpm.

After 2 hours from that (after 3 hours from polymerization initiation), 12.8 mmol of N-[3-(dimethylamino)propyl]acrylamide was added to the polymer solution, and the polymer solution was stirred for 15 minutes.

Then, a cyclohexane solution of sec-butyllithium (sec-butyllithium content 38.4 mmol), and 6.9 ml of 1,1,2,2-tetramethylethylenediamine were placed into the polymerization reactor, followed by stirring for 30 minutes.

Further, 38.4 mmol of [3-(diethylamino)propyl]trimethoxysilane was added, followed by stirring for 15 minutes.

To the polymer solution was added 20 ml of a hexane solution containing 4.0 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM manufactured by Sumitomo Chemical Co., Ltd.), and 4.0 g of pentaerythrityltetrakis(3-laurylthiopropionate) (trade name: Sumilizer TP-D manufactured by Sumitomo Chemical Co., Ltd.), then, the polymer solution was allowed to evaporate at normal temperature for 24 hours, and further dried at 55° C. for 12 hours under reduced pressure to obtain a polymer. Assessment results of the polymer are shown in Table 2.

Then, 100 parts by weight of the resulting polymer, 78.4 parts by weight of silica (trade name: Ultrasil VN3-G manufactured by Degussa), 6.4 parts by weight of a silane coupling agent (trade name: Si69 manufactured by Degussa), 6.4 parts by weight of carbon black (trade name: DIABLACK N339 manufactured by Mitsubishi Chemical Corporation), 47.6 parts by weight of an extender oil (trade name: JOMO Process NC-140 manufactured by Japan Energy Corporation), 1.5 parts by weight of an antiaging agent (trade name: Antigen 3C manufactured by Sumitomo Chemical Co., Ltd.), 2 parts by weight of stearic acid, 2 parts by weight of zinc flower, 1 part by weight of a vulcanization accelerator (trade name: Soxinol CZ manufactured by Sumitomo Chemical Co., Ltd.), 1 part by weight of a vulcanization accelerator (trade name: Soxinol D manufactured by Sumitomo Chemical Co., Ltd.), 1.5 parts by weight of a wax (trade name: Sunnoc N manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated to vulcanize at 160° C. for 45 minutes to prepare a vulcanized sheet. The results of physical property assessment of the vulcanized sheet are shown in Table 2.

Comparative Example 1

A polymerization reactor made of stainless steel equipped with a stirring device of an internal volume of 5 L was washed, dried, and replaced with dry nitrogen. Then, 2.55 kg of industrial hexane (density 680 kg/m$^3$), 137 g of 1,3-butadiene, 43 g of styrene, 1.52 ml of tetrahydrofuran, and 1.09 ml of ethylene glycol diethyl ether were placed into the polymerization reactor. Then, an n-hexane solution of n-butyllithium (n-butyllithium content 3.36 mmol) was placed into the polymerization reactor, and a polymerization reaction was initiated.

A copolymerization reaction of 1,3-butadiene and styrene was performed at a temperature in the polymerization reactor of 65° C. and a stirring rate of 130 rpm for 2 hours and 30 minutes, while 1,3-butadiene and styrene were continuously supplied to the polymerization reactor. The supply amount of 1,3-butadiene was 205 g, and the supply amount of styrene was 65 g.

To the polymer solution was added 5 ml of a hexane solution containing 0.21 ml of 1-butanol, and the polymer solution was stirred for 15 minutes.

Then, a cyclohexane solution of sec-butyllithium (sec-butyllithium content 14.4 mmol), and 2.59 ml (17.4 mmol) of 1,1,2,2-tetramethylethylenediamine were placed into the polymerization reactor, followed by stirring for 30 minutes.

Further, 14.4 mmol of [3-(diethylamino)propyl]trimethoxysilane was added, followed by stirring for 15 minutes.

To the polymer solution was added 5 ml of a hexane solution containing 1.0 ml of methanol, and the polymer solution was stirred for 5 minutes. Then, to the polymer solution were added 1.8 g of 2-tert-butyl-6-(3-tert-butyl-2-hydroxy-5-methylbenzyl)-4-methylphenyl acrylate (trade name: Sumilizer GM manufactured by Sumitomo Chemical Co., Ltd.), and 0.9 g of pentaerythrityltetrakis(3-laurylthiopropionate) (trade name: Sumilizer TP-D manufactured by Sumitomo Chemical Co., Ltd.), then, the polymer solution was allowed to stand at room temperature for 16 hours, and the solvent was evaporated to obtain a polymer. Thereafter, the resulting polymer was further dried at 55° C. for 6 hours under reduced pressure. Assessment results of the polymer are shown in Table 3.

Then, 100 parts by weight of the resulting polymer, 78.4 parts by weight of silica (trade name: Ultrasil VN3-G manufactured by Degussa), 6.4 parts by weight of a silane coupling agent (trade name: Si69 manufactured by Degussa), 6.4 parts by weight of carbon black (trade name: DIABLACK N339 manufactured by Mitsubishi Chemical Corporation), 47.6 parts by weight of an extender oil (trade name: JOMO Process NC-140 manufactured by Japan Energy Corporation), 1.5 parts by weight of an antiaging agent (trade name: Antigen 3C manufactured by Sumitomo Chemical Co., Ltd.), 2 parts by weight of stearic acid, 2 parts by weight of zinc flower, 1 part by weight of a vulcanization accelerator (trade name: Soxinol CZ manufactured by Sumitomo Chemical Co., Ltd.), 1 part by weight of a vulcanization accelerator (trade name: Soxinol D manufactured by Sumitomo Chemical Co., Ltd.), 1.5 parts by weight of a wax (trade name: Sunnoc N manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated to vulcanize at 160° C. for 45 minutes to prepare a vulcanized sheet of 150 mm in width, 150 mm in length, and 1.2 mm in thickness. The results of physical property assessment of the vulcanized sheet are shown in Table 3.

Reference Example

In the Example 2, the following experiment was performed so as to find the degrees of progress of polymerization after 20 minutes from polymerization initiation and after 40 minutes from polymerization initiation.

A polymerization reaction was initiated in the same manner as in the Example 2, and a copolymerization reaction of 1,3-butadien, styrene and 4-methylstyrene was performed while 1,3-butadiene and styrene were continuously supplied to the polymerization reactor. The supply amounts of 1,3-butadiene and styrene were the same as in the Example 2.

After 20 minutes from polymerization initiation, about 10 ml of the polymer solution was withdrawn, immediately after that, 20 ml of a hexane solution containing 1.51 g (12.8 mmol) of 4-methylstyrene was rapidly placed into the polymerization reactor at a polymerization temperature of 65° C. and a stirring rate of 130 rpm. To the withdrawn polymer solution, about 0.5 ml of methanol was immediately added.

After 20 minutes from that (after 40 minutes from polymerization initiation), about 10 ml of the polymer solution was withdrawn, immediately after that, 20 ml of a hexane solution containing 1.51 g (12.8 mmol) of 4-methylstyrene was rapidly placed into the polymerization reactor at a polymerization temperature of 65° C. and a stirring rate of 130 rpm. To the withdrawn polymer solution, about 0.5 ml of methanol was immediately added.

After 2 hours and 20 minutes from that (after 3 hours from polymerization initiation), 20 ml of a hexane solution containing 1.2 ml of 1-butanol was added to the polymer solution, and the polymer solution was stirred for 15 minutes. Then, about 10 ml of the polymer solution was withdrawn.

The polymer solutions withdrawn after 20 minutes and after 40 minutes from polymerization initiation and after termination procedure of polymerization were allowed to stand at room temperature for 6 hours, and the solvent was evaporated to obtain a polymer. Thereafter, a molecular weight of each polymer was measured. As the result, the molecular weight of the polymer solutions withdrawn after 20 minutes and after 40 minutes from polymerization initiation and after termination procedure of polymerization were $7.1 \times 10^4$, $1.2 \times 10^5$, and $2.6 \times 10^5$, respectively. As the result of calculation, the degree of progress of polymerization after 20 minutes from polymerization initiation was 28% and the degree of progress of polymerization after 40 minutes from polymerization initiation was 48%.

TABLE 1

| | | Example 1 | Example 2 | Example 3 | Example 4 |
|---|---|---|---|---|---|
| Mooney viscosity | | 69.8 | 51.0 | 133.4 | 123.5 |
| Amount of vinyl bonds | mol % | 58.7 | 57.2 | 56.7 | 56.9 |
| Content of styrene unit | wt % | 24.5 | 25.3 | 24.3 | 23.6 |
| Molecular weight distribution | — | | 1.34 | 1.25 | — | — |
| Fuel cost saving effect tan δ (70° C.) | | 0.138 | 0.120 | 0.130 | 0.125 |
| Gripping properties tan δ (0° C.) | | 0.632 | 0.703 | 0.605 | 0.599 |
| Tensile strength at break | MPa | 13.8 | 15.7 | 10.4 | 7.9 |
| Tensile elongation at break | % | 280 | 390 | 160 | 115 |

TABLE 2

| | | Example 5 | Example 6 | Example 7 | Example 8 |
|---|---|---|---|---|---|
| Mooney viscosity | | 70.7 | 58.3 | 47.3 | 54.1 |
| Amount of vinyl bonds | mol % | 57.7 | 58.4 | 57.0 | 55.4 |
| Content of styrene unit | wt % | 25.2 | 24.6 | 24.9 | 24.5 |
| Molecular weight distribution | — | 1.33 | 1.26 | 1.20 | 1.30 |
| Fuel cost saving effect tan δ (70° C.) | | 0.128 | 0.121 | 0.118 | 0.117 |
| Gripping properties tan δ (0° C.) | | 0.689 | 0.706 | 0.661 | 0.692 |
| Tensile strength at break | MPa | 14.2 | 16.5 | 18.3 | 18.0 |
| Tensile elongation at break | % | 275 | 355 | 440 | 450 |

TABLE 3

| | | Comparative Example 1 |
|---|---|---|
| Mooney viscosity | | 43.1 |
| Amount of vinyl bonds | mol % | 56.7 |
| Content of styrene unit | wt % | 23.1 |
| Molecular weight distribution | — | 1.07 |
| Fuel cost saving effect tan δ (70° C.) | | 0.205 |
| Gripping properties tan δ (0° C.) | | 0.636 |
| Tensile strength at break | MPa | 13.3 |
| Tensile elongation at break | % | 390 |

Example 9

A polymerization reactor made of stainless steel equipped with a stirring device of an internal volume of 20 L was washed, dried, and replaced with dry nitrogen. Then, 10.2 kg of industrial hexane (density 680 kg/m³), 608 g of 1,3-butadiene, 192 g of styrene, 1.51 g of 4-methylstyrene, 6.1 ml of tetrahydrofuran, and 4.4 ml of ethylene glycol diethyl ether were placed into the polymerization reactor. Then, an n-hexane solution of n-butyllithium (n-butyllithium content 20.0 mmol) was placed into the polymerization reactor, and a polymerization reaction was initiated.

A copolymerization reaction of 1,3-butadiene, styrene and 4-methylstyrene was performed at a temperature for 3 hours in the polymerization reactor of 65° C. and a stirring rate of 130 rpm, while 1,3-butadiene and styrene were continuously supplied to the polymerization reactor. The supply amount of 1,3-butadiene in polymerization was 912 g, and the supply amount of styrene was 288 g.

After 20 minutes from polymerization initiation, 20 ml of a hexane solution containing 1.51 g of 4-methylstyrene was rapidly placed into the polymerization reactor at a polymerization temperature of 65° C. and a stirring rate of 130 rpm.

After 40 minutes from that (after 60 minutes from polymerization initiation), 20 ml of a hexane solution containing 1.51 g of 4-methylstyrene was rapidly placed into the polymerization reactor at a polymerization temperature of 65° C. and a stirring rate of 130 rpm.

After 2 hours from that (after 3 hours from polymerization initiation), 20 ml of a hexane solution containing 1.8 ml of 1-butanol was added to the polymer solution, and the polymer solution was stirred for 15 minutes.

Then, a cyclohexane solution of sec-butyllithium (sec-butyllithium content 64.0 mmol), and 11.5 ml of 1,1,2,2-tetramethylethylenediamine were placed into the polymerization reactor, followed by stirring for 30 minutes.

Further, 64.0 mmol of 1,3,5-tris[3-(trimethoxysilyl)propyl]isocyanurate was added, followed by stirring for 15 minutes.

To the polymer solution was added 20 ml of a hexane solution containing 3.0 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM manufactured by Sumitomo Chemical Co., Ltd.), and 4.0 g of pentaerythrityltetrakis(3-laurylthiopropionate) (trade name: Sumilizer TP-D manufactured by Sumitomo Chemical Co., Ltd.), then, the polymer solution was allowed to evaporate at normal temperature for 24 hours, and further dried at 55° C. for 12 hours under reduced pressure to obtain a polymer. Assessment results of the polymer are shown in Table 4.

Then, 100 parts by weight of the resulting polymer, 78.4 parts by weight of silica (trade name: Ultrasil VN3-G manufactured by Degussa), 6.4 parts by weight of a silane coupling agent (trade name: Si69 manufactured by Degussa), 6.4 parts by weight of carbon black (trade name: DIABLACK N339 manufactured by Mitsubishi Chemical Corporation), 47.6 parts by weight of an extender oil (trade name: JOMO Process NC-140 manufactured by Japan Energy Corporation), 1.5 parts by weight of an antiaging agent (trade name: Antigen 3C manufactured by Sumitomo Chemical Co., Ltd.), 2 parts by weight of stearic acid, 2 parts by weight of zinc flower, 1 part by weight of a vulcanization accelerator (trade name: Soxinol CZ manufactured by Sumitomo Chemical Co., Ltd.), 1 part by weight of a vulcanization accelerator (trade name: Soxinol D manufactured by Sumitomo Chemical Co., Ltd.), 1.5 parts by weight of a wax (trade name: Sunnoc N manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated to vulcanize at 160° C. for 45 minutes to prepare a vulcanized sheet. The results of physical property assessment of the vulcanized sheet are shown in Table 4.

TABLE 4

|  |  | Example 9 |
|---|---|---|
| Mooney viscosity |  | 72.7 |
| Amount of vinyl bonds | mol % | 57.4 |
| Content of styrene unit | wt % | 25.1 |
| Molecular weight distribution | — | 1.6 |
| Fuel cost saving effect tan δ (70° C.) |  | 0.165 |
| Gripping properties tan δ (0° C.) |  | 0.631 |
| Tensile strength at break | MPa | 10.2 |
| Tensile elongation at break | % | 260 |

What is claimed is:

1. A process for producing a modified conjugated diene-based polymer, comprising reacting a conjugated diene-based polymer having a monomer unit based on a conjugated diene compound and a monomer unit based on a compound represented by the following formula (1) with an organometallic compound selected from a group consisting of an organolithium compound, an organosodium compound, and an organopotassium compound, and reacting the resulting reaction product with a hydrocarbyloxysilane compound:

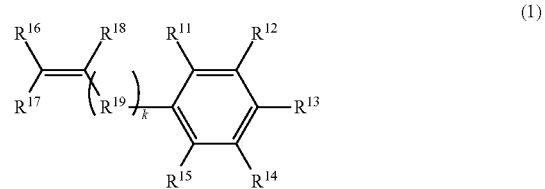

wherein $R^{11}$, $R^{12}$, $R^{13}$, $R^{14}$ and $R^{15}$ each represent a hydrogen atom or an alkyl group, at least one of $R^{11}$, $R^{12}$, $R^{13}$, $R^{14}$ and $R^{15}$ is an alkyl group, $R^{16}$, $R^{17}$ and $R^{18}$ each represent a hydrogen atom or a hydrocarbyl group, $R^{19}$ represents a hydrocarbylene group, and k represents 0 or 1, wherein the organolithium compound comprises a hydrocarbyllithium compound or a hydrocarbylenedilithium compound, the organosodium compound comprises sodium naphthalenide or sodium biphenylenide, and the organopotassium compound comprises potassium naphthalenide, and wherein the content of the monomer unit based on the compound represented by the formula (1) is 0.01% by weight or more and 0.5% by weight or less, letting the total amount of the monomer unit contained in the conjugated diene-based polymer be 100% by weight.

2. The process for producing a modified conjugated diene-based polymer according to claim 1, wherein the hydrocarbyloxysilane compound is a hydrocarbyloxysilane compound having a nitrogen atom-containing group.

3. The process for producing a modified conjugated diene-based polymer according to claim 2, wherein the hydrocarbyloxysilane compound is a hydrocarbyloxysilane compound having a substituted amino group.

4. The process for producing a modified conjugated diene-based polymer according to claim 1, wherein the conjugated diene-based polymer has a nitrogen atom-containing group on at least one of polymer chain ends.

5. A modified conjugated diene-based polymer produced by the process as defined in claim 1.

6. A polymer composition comprising the modified conjugated diene-based polymer as defined in claim 5 and a reinforcing agent, wherein the content of the reinforcing agent is 10 parts by weight to 150 parts by weight per the content of 100 parts by weight of the modified conjugated diene-based polymer.

* * * * *